US012576448B2

(12) United States Patent (10) Patent No.: US 12,576,448 B2
Ishimine et al. (45) Date of Patent: Mar. 17, 2026

(54) TOOL MAIN BODY AND METHOD FOR PRODUCING TOOL MAIN BODY

(71) Applicants: Sumitomo Electric Industries, Ltd., Osaka (JP); Sumitomo Electric Sintered Alloy, Ltd., Takahashi (JP)

(72) Inventors: Tomoyuki Ishimine, Osaka (JP); Mitsuhiro Goto, Osaka (JP); Shigeki Egashira, Osaka (JP); Kazunari Shimauchi, Osaka (JP)

(73) Assignees: SUMITOMO ELECTRIC INDUSTRIES, LTD., Osaka (JP); SUMITOMO ELECTRIC SINTERED ALLOY, LTD., Takahashi (JP)

( * ) Notice: Subject to any disclaimer, the term of this patent is extended or adjusted under 35 U.S.C. 154(b) by 751 days.

(21) Appl. No.: 17/792,727

(22) PCT Filed: Oct. 29, 2020

(86) PCT No.: PCT/JP2020/040686
§ 371 (c)(1),
(2) Date: Jul. 14, 2022

(87) PCT Pub. No.: WO2021/166331
PCT Pub. Date: Aug. 26, 2021

(65) Prior Publication Data
US 2023/0054503 A1 Feb. 23, 2023

(30) Foreign Application Priority Data
Feb. 18, 2020 (JP) ................................. 2020-025191

(51) Int. Cl.
B22F 5/00 (2006.01)
B22F 7/00 (2006.01)
B23B 27/16 (2006.01)

(52) U.S. Cl.
CPC .............. B23B 27/16 (2013.01); B22F 7/004 (2013.01); B22F 2005/001 (2013.01); B23C 2228/49 (2013.01)

(58) Field of Classification Search
CPC ......... B23B 27/16; B23B 27/00; B22F 7/004; B22F 2005/001; B22F 3/1103; B22F 2003/1106; B23C 2228/49; B23C 5/006; C22C 33/0264; C22C 38/002; C22C 38/08; C22C 38/12
See application file for complete search history.

(56) References Cited

U.S. PATENT DOCUMENTS 4,205,425 A 6/1980 Shinozaki
4,887,496 A * 12/1989 Kobayashi ................ B22F 5/00
419/25

(Continued)

FOREIGN PATENT DOCUMENTS

JP 54-7691 A 1/1979
JP 2-4905 A 1/1990

(Continued)

*Primary Examiner* — Rebecca Janssen
(74) *Attorney, Agent, or Firm* — XSENSUS LLP

(57) ABSTRACT

A tool main body to which an insert is attachable, in which the tool main body is made of sintered metal material, and the sintered metal material includes a parent phase made of a metal and a plurality of pores present in the parent phase.

16 Claims, 7 Drawing Sheets

(56)          References Cited

U.S. PATENT DOCUMENTS

2001/0051076  A1      12/2001   Kunimori et al.
2011/0182684  A1       7/2011   Yoon et al.
2018/0065196  A1*      3/2018   Kachler  ................. B23B 27/10

FOREIGN PATENT DOCUMENTS

JP          2001-300813  A      10/2001
JP           2005-66714  A       3/2005
JP          2009-154251  A       7/2009
JP           2010-53414  A       3/2010
JP          2011-527728  A      11/2011
JP          2012-524667  A      10/2012
JP           2016-56445  A       4/2016
JP           2019019362  A   *   2/2019
WO          2010/125555  A1     11/2010

* cited by examiner

10μm

TOOL MAIN BODY AND METHOD FOR PRODUCING TOOL MAIN BODY

CROSS-REFERENCE TO RELATED APPLICATIONS

The present application is based on PCT/JP2020/040686 filed on Oct. 29, 2020, which claims priority to Japanese Application No. 2020-025191, filed on Feb. 18, 2020, the entire contents of each are incorporated herein by reference.

TECHNICAL FIELD

The present disclosure relates to a tool main body and a method for producing a tool main body.

BACKGROUND ART

PTL 1 discloses a tool for removal processing including a blade portion having a cutting blade and a main body to which the blade portion is fixed. The tool main body described in PTL 1 is made of a so-called porous metal. In this porous metal, a number of voids are formed in strips along a cooling direction due to precipitation of gas atoms in a solidification process where a metal in a molten state containing the dissolved gas atoms is gradually cooled and solidified in a predetermined direction.

CITATION LIST

Patent Literature

PTL 1: Japanese Patent Laying-Open No 2005-66714

SUMMARY OF INVENTION

A tool main body of the present disclosure is
a tool main body to which an insert is attachable,
wherein the tool main body is made of a sintered metal material, and
the sintered metal material includes
a parent phase made of a metal and
a plurality of pores present in the parent phase.
A method for producing a tool main body of the present disclosure includes:
molding a powder compact by compressing a raw material powder;
mechanically processing the powder compact into a shape of a tool main body to which an insert is attachable; and
sintering the powder compact processed into the shape of the tool main body.

DETAILED DESCRIPTION

Figure 1A:
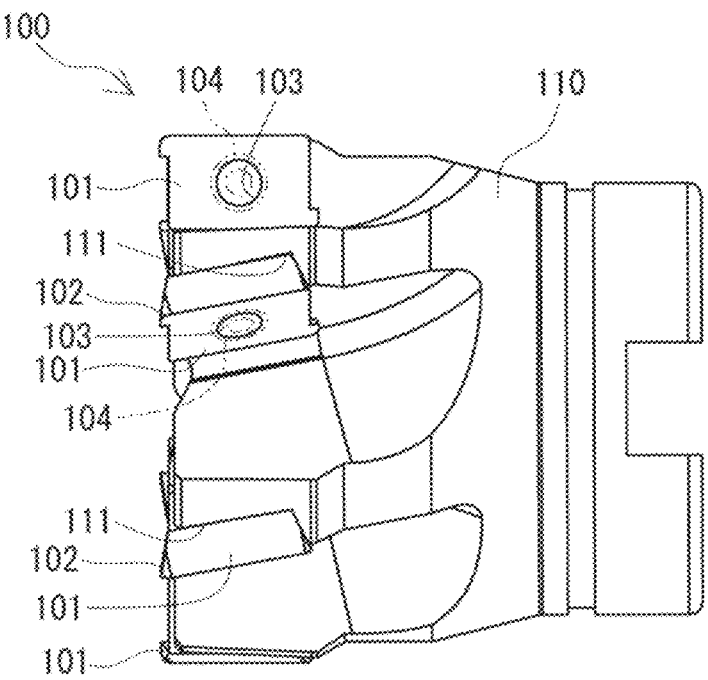
FIG. 1A is a side view showing an example of a cutter including a tool main body according to an embodiment.

Problem to be Solved by the Present Disclosure

Conventionally, blade edge-replaceable cutting tools including an insert having a cutting blade and a tool main body to which the insert is attachable are known. The insert provides the blade edge of the cutting tool. Ordinarily, the tool main body is produced by mechanically processing a cast material of metal such as tool steel. Conventionally, cast materials forming tool main bodies are solid metal materials in which pores are substantially not present.

The tool main body described in PTL 1 is made of a porous metal, and thus there is a concern that a stable strength may not be obtained. PTL 1 purports that chatter or the like can be suppressed due to a vibration suppressing effect of pores since the tool main body is made of a porous metal. The porous metal is produced by cooling a molten metal in a predetermined direction and thus has a number of pores formed in strips along a specific direction. These pores can be controlled such that the longitudinal directions thereof are roughly aligned, but it is difficult to control the size of each pore or the position of each pore. Therefore, in the porous metal, the sizes of pores may vary, and there is a possibility that coarse pores may be generated. When coarse pores are present in the porous metal forming a tool main body, the strength of the tool main body decreases. Furthermore, since it is not possible to control the positions of pores, there is another possibility that coarse pores may be positioned at sites where stress concentrates while the tool main body is in use.

In addition, in the porous metal, a number of pores are regularly formed so as to be along a specific direction. Therefore, it is considered that in a case where a tool main body is made of such a porous metal, the tool main body is likely to crack along a specific direction. In recent years, there has been a case where processing is performed in multiple directions with a single tool in order for the processing of a complicated shape. When a number of pores are present along a predetermined direction in the porous metal forming a tool main body, cracks are likely to be generated along the specific direction during processing, and accordingly, there is a possibility that the strength of the tool main body may be insufficient.

An objective of the present disclosure is to provide a tool main body having excellent vibration damping and a stable strength. In addition, another objective of the present disclosure is to provide a method for producing a tool main body by which excellent vibration damping and a stable strength can be obtained.

Advantageous Effect of the Present Disclosure

The tool main body of the present disclosure is excellent in terms of vibration damping and has a stable strength. The method for producing a tool main body of the present disclosure is capable of producing a tool main body having excellent vibration damping and a stable strength.

DESCRIPTION OF EMBODIMENTS

The present inventors propose to make a tool main body of a sintered metal material. The sintered metal material is a material obtained by molding and sintering a metal powder.

First, embodiments of the present disclosure will be listed and described.

(1) A tool main body according to an embodiment of the present disclosure is a tool main body to which an insert is attachable, in which the tool main body is made of a sintered metal material, and the sintered metal material includes a parent phase made of a metal and a plurality of pores present in the parent phase.

The tool main body of the present disclosure is made of a sintered metal material and is thus excellent in terms of vibration damping and has a stable strength. The sintered metal material has a plurality of pores in the parent phase and is thus capable of effectively suppressing vibrations. Therefore, the sintered metal material is excellent in terms of vibration damping compared with solid cast materials. Therefore, the tool main body of the present disclosure is excellent in terms of vibration damping. In a case where the tool main body of the present disclosure is used for a cutting tool, it is possible to suppress chatter or the like during processing, and the processing accuracy improves.

Ordinarily, in the sintered metal material, a plurality of pores is dispersed in the parent phase in an isotropic manner. The expression "being dispersed in an isotropic manner" means that the sizes of pores do not depend on directions. That is, in the sintered metal material, unlike the porous metal described in PTL 1, pores are not formed in strips along a specific direction. Therefore, in the sintered metal material, cracks are unlikely to be generated along a specific direction. Furthermore, it is possible to suppress the formation of coarse pores in the sintered metal material, compared with the porous metal. Therefore, when a tool main body is made of the sintered metal material, it is possible to suppress a decrease in the strength of the tool main body. In a case where the tool main body of the present disclosure is used for a cutting tool, variations in the strength of the tool main body in the multiple directions are small even when processing is performed in multiple directions with a single tool. Therefore, the tool main body of the present disclosure has a stable strength.

Additionally, the sintered metal material has a plurality of pores and is thus capable of reducing the weight of the tool main body compared with solid cast materials. In addition, in the sintered metal material, it is possible to effectively release heat through the plurality of pores. Therefore, the tool main body of the present disclosure is also excellent in terms of a heat dissipation property.

(2) In one embodiment of the tool main body of the present disclosure, the sintered metal material has a relative density of 85% or more and 99.9% or less.

In the embodiment, it is easy to satisfy both the strength and vibration damping of the tool main body. The sintered metal material has a relative density of 85% or more and is dense. Since the sintered metal material has a small number of pores, the pores are unlikely to serve as the origins of cracks. Therefore, in the embodiment, it is possible to increase the strength of the tool main body. The sintered metal material has a relative density of 99.9% or less and thus includes pores. Therefore, in the embodiment, it is possible to improve the vibration damping or heat dissipation property of the tool main body. In addition, the weight reduction of the tool main body is possible.

(3) In one embodiment of the tool main body of the present disclosure, the sintered metal material has a relative density of 93% or more and 99.5% or less.

In the embodiment, it is possible to further satisfy both the strength and vibration damping of the tool main body. When the relative density of the sintered metal material is 93% or more, the number of pores is smaller, and thus, the pores are more unlikely to serve as the origins of cracks. Therefore, in the embodiment, it is possible to further increase the strength of the tool main body. The sintered metal material has a relative density of 99.5% or less and thus appropriately includes pores. Therefore, in the embodiment, it is possible to further improve the vibration damping or heat dissipation property of the tool main body. In addition, it is possible to further reduce the weight of the tool main body.

(4) In one embodiment of the tool main body of the present disclosure, the average perimeter of the pores on an arbitrary cross section of the sintered metal material is 100 μm or less.

In the embodiment, it is possible to further increase the strength of the tool main body. The sintered metal material includes a plurality of pores, but each pore is unlikely to serve as the origin of a crack. The reason therefor is that, when the average perimeter of the pores is 100 μm or less, it can be said that, among the plurality of pores, a number of pores have a short perimeter. A pore having a short perimeter has a small cross-sectional area and is unlikely to serve as the origin of a crack. Furthermore, in the embodiment, since the pores are small, the vibration damping of the tool main body improves.

The sintered metal material is produced by sintering at a relatively low temperature and is thus excellent in terms of productivity. When the sintering temperature is low, it is possible to reduce the heat energy. When a powder compact is sintered at a high temperature at which a liquid phase is formed, pores are likely to become large. Large pores are likely to serve as the origins of cracks. If the pores serve as the origins of cracks, the strength of the sintered metal material decreases. In contrast, when the powder compact is sintered at a relatively low temperature, it is possible to obtain a sintered metal material in which pores are small. In addition, in a case where the powder compact is sintered at a low temperature, a sintered metal material having an excellent shape accuracy or dimension accuracy is likely to be obtained compared with a case where the powder compact is sintered at a high temperature. Therefore, it is possible to improve the yield of the sintered metal material.

(5) In one embodiment of the tool main body of the present disclosure, the average cross-sectional area of the pores on an arbitrary cross section of the sintered metal material is 500 $\mu m^2$ or less.

In the embodiment, it is possible to further increase the strength of the tool main body. The sintered metal material includes a plurality of pores, but each pore is unlikely to serve as the origin of a crack. The reason therefor is that, when the average cross-sectional area of the pores is 500 $\mu m^2$ or less, it can be said that, among the plurality of pores, a number of pores have a small cross-sectional area. A pore having a small cross-sectional area is unlikely to serve as the origin of a crack. Furthermore, in the embodiment, since the pores are small, the vibration damping of the tool main body improves.

The sintered metal material is produced by sintering at a relatively low temperature and is thus excellent in terms of productivity. The reason therefor is as described above.

(6) In one embodiment of the tool main body according to (4) or (5), the average value of the maximum diameters of the pores is 5 $\mu m$ or more and 30 $\mu m$ or less.

In the embodiment, it is possible to further increase the strength of the tool main body. In the sintered metal material, when the average value of the maximum diameters of the pores is within the above-described range, the perimeters of the pores are short or the cross-sectional areas of the pores are small. When the average value of the maximum diameters of the pores is 30 $\mu m$ or less, it can be said that, among the plurality of pores, a number of pores are short and small. Therefore, each pore is more unlikely to serve as the origin of a crack. Furthermore, in the embodiment, since the pores are generally small, the vibration damping of the tool main body further improves. When the average value of the maximum diameters of the pores is 5 $\mu m$ or more, the pores are not too small, and a vibration suppression effect is strong.

(7) In one embodiment of the tool main body of the present disclosure, the plurality of pores is dispersed in the parent phase in an isotropic manner.

In the embodiment, since the pores are not oriented in a specific direction, cracks are unlikely to be generated along a specific direction.

(8) In one embodiment of the tool main body of the present disclosure, the metal is an iron-based alloy, and the iron-based alloy contains one or more elements selected from the group consisting of C, Ni, Mo and B.

In the embodiment, it is possible to increase the strength of the tool main body. The iron-based alloy containing the element listed above, for example, steel, which is an iron-based alloy containing C, is excellent in terms of a strength. Therefore, the tool main body of the embodiment has a high strength.

(9) A method for producing a tool main body according to an embodiment of the present disclosure includes:

molding a powder compact by compressing a raw material powder containing a metal powder;

mechanically processing the powder compact into a shape of a tool main body to which an insert is attachable; and sintering the powder compact processed into the shape of the tool main body.

The method for producing a tool main body of the present disclosure enables the production of a tool main body that is made of a sintered metal material. When a tool main body is made of a sintered metal material, the tool main body obtained can be excellent in terms of vibration damping and have a stable strength as described above. Furthermore, in a case where a tool main body is made of a sintered metal material, it is possible to reduce the weight of the tool main body or improve the heat dissipation property.

In the method for producing a tool main body of the present disclosure, since the powder compact is mechanically processed into the shape of the tool main body, the tool main body can be produced with favorable productivity. The powder compact before sintering still remains as a molded metal powder and is thus easily cut compared with the sintered metal material after sintering. In the production method of the present disclosure, since the powder compact is processed, the processing time is short, and furthermore, the service life of a processing tool can also be extended compared with a case where the sintered metal material is processed. In addition, since cutting can be easily performed, a tool main body having an excellent shape accuracy or dimension accuracy is likely to be obtained. Therefore, in the production method of the present disclosure, a tool main body having a high shape accuracy or dimension accuracy can be obtained, and thus the yield can be increased.

(10) In one embodiment of the method for producing a tool main body of the present disclosure, in molding the powder compact, the powder compact has a relative density of 85% or more and 99.9% or less.

In the embodiment, since the powder compact has a relative density of 85% or more, a sintered metal material having a relative density of 85% or more can be obtained. This sintered metal material has a small number of pores, and thus the pores are unlikely to serve as the origins of cracks. Therefore, in the embodiment, it is possible to increase the strength of the tool main body. In addition, in the embodiment, since the above-described dense powder compact is used, a tool main body made of a dense sintered metal material having a high relative density can be obtained even when the powder compact is sintered at a relatively low temperature such as lower than 1300° C. On the other hand, since the powder compact has a relative density of 99.9% or less, it is possible to set the relative density of the sintered metal material to 99.9% or less. This sintered metal material includes pores and is thus capable of improving the vibration damping or heat dissipation property of the tool main body. In addition, the weight reduction of the tool main body is possible.

(11) In one embodiment of the method for producing a tool main body of the present disclosure, in sintering the powder compact, the sintering temperature is 1000° C. or more and lower than 1300° C.

In the embodiment, since the powder compact is sintered at a temperature of 1000° C. or more and lower than 1300° C., the productivity is excellent. Since the sintering temperature is lower than 1300° C., it is possible to reduce the heat energy. Furthermore, since the sintering temperature is a relatively low temperature, it is possible to suppress the formation of coarse pores. Therefore, a sintered metal material in which pores are small is likely to be obtained. Typically, a sintered metal material is obtained in which the average perimeter of pores is 100 $\mu m$ or less or the average cross-sectional area of pores is 500 $\mu m^2$ or less. Therefore, in the embodiment, it is possible to further increase the strength of the tool main body. In addition, in a case where the powder compact is sintered at a low temperature, a tool main body having an excellent shape accuracy or dimension accuracy is likely to be obtained compared with a case where the powder compact is sintered at a high temperature. Therefore, in the embodiment, the yield can be further increased.

(12) In one embodiment of the method for producing a tool main body of the present disclosure, the metal powder contains a powder made of an iron-based material having Vickers hardness Hv of 80 or more and 200 or less.

In the embodiment, a tool main body having a high strength can be obtained. Typical examples of the iron-based material include iron-based alloys. Ordinarily, iron-based alloys have a high strength. Therefore, when a metal powder is made of an iron-based material, the sintered metal material obtained can have a high strength. Furthermore, when a powder of an iron-based material having Vickers hardness Hv of 80 or more and 200 or less is used as the metal powder, the above-described dense powder compact is likely to be obtained. When a dense powder compact is sintered, a dense sintered metal material can be obtained. Therefore, in the embodiment, it is possible to increase the strength of the tool main body.

(13) In one embodiment of the method for producing a tool main body according to (12), the powder made of the iron-based material contains a powder made of an iron-based alloy, and the iron-based alloy contains at least one element of Mo in an amount of 0.1 mass % or more and 2.0 mass % or less and Ni in an amount of 0.5 mass % or more and 5.0 mass % or less.

In the embodiment, a powder of an iron-based alloy having Vickers hardness Hv of 80 or more and 200 or less is likely to be obtained.

Detail of Embodiment of Present Disclosure

Hereinafter, the tool main body and method for producing a tool main body according to the embodiments of the present disclosure will be described with appropriate reference to drawings. The same reference signs in the drawings indicate substances having the same name. The present invention is not limited to these examples, and the present invention is indicated by the claims and is intended to include equivalent meaning to the claims and all modifications within the scope.

[Tool Main Body]

Tool main bodies 110 and 210 of the embodiments will be described with reference to, mainly, FIGS. 1A, 1B and 1C. Hereinafter, FIGS. 1A, 1B and 1C may be collectively referred to as FIG. 1.

Figure 1B:
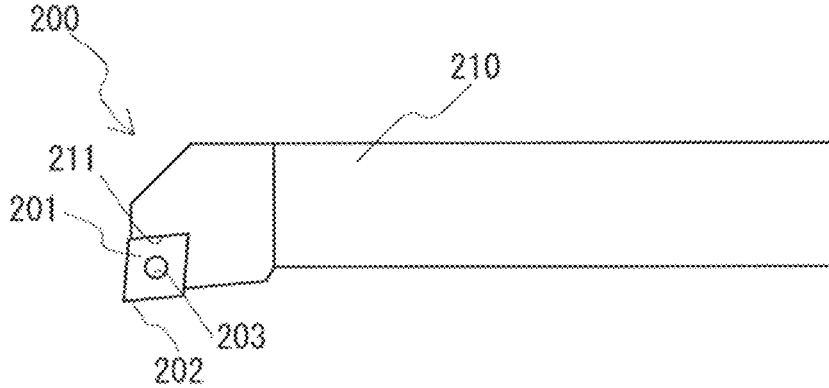
FIG. 1B is a plan view showing an example of a bit including the tool main body according to the embodiment.
Figure 1C:
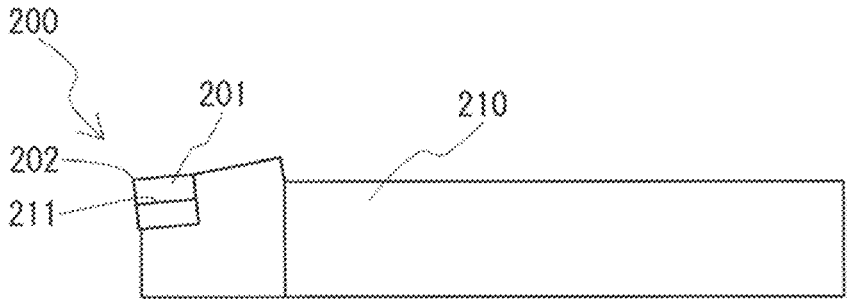
FIG. 1C is a side view showing another example of a bit including the tool main body according to the embodiment.

Tools 100 and 200 shown in FIG. 1 are cutting tools. Tool 100 shown in FIG. 1A is a cutter, which is an example of a milling cutter. Tool 200 shown in FIGS. 1B and 1C is a bit, which is an example of a lathe. Tool 100 or 200 includes an insert 101 or 201 and a tool main body 110 or 210 to which insert 101 or 201 is attachable. Inserts 101 and 201 may be referred to as chips. Tool main body 110 or 210 is a member to which insert 101 or 201 is fixed. Normally, tool main body 110 or 210 is attachable to a tool rest or a main shaft.

Insert 101 or 201 has a cutting blade 102 or 202. Insert 101 or 201 provides the blade edge of tool 100 or 200. Examples of the kind of material of inserts 101 and 201 include cemented carbide, cermets, cubic boron nitride (CBN) sintered bodies, diamond sintered bodies, and high-speed steel. As the shape of insert 101 or 201, a well-known shape can be adopted.

Tool main body 110 or 210 has an attaching seat 111 or 211 to which insert 101 or 201 is attachable. Attaching seat 111 or 211 in the present example is provided at the tip portion of tool main body 110 or 210. One example of attaching seat 111 or 211 is a recessed portion corresponding to the shape of insert 101 or 201. The shape of attaching seat 111 in the present example is a substantially square shape. The shape of attaching seat 211 in the present example is a substantially triangle shape. Insert 101 or 201 is attached such that cutting blade 102 or 202 protrudes from attaching seat 111 or 211. In the present example, insert 101 or 201 is detachably mounted in attaching seat 111 or 211 with a screw not shown. Specifically, as shown in FIGS. 1A and 1B, insert 101 or 201 is screwed to attaching seat 111 or 211 with the screw being inserted into a through hole 103 or 203 formed in insert 101 or 201. Insert 101 or 201 may be fixed to attaching seat 111 or 211 by, for example, brazing. As the shape of tool main body 110 or 210, a well-known shape can be adopted. Tool main body 110, which is a cutter, of the present example has a substantially cylindrical shape having a shaft hole for a rotary shaft. The outer diameter of tool main body 110 on the tip side is larger than the outer diameter on the root side. The number of attaching seats 111 and the number of inserts 101 in tool main body 110 are six. Tool main body 210, which is a bit, of the present example has a square bar-like shank and a block-like holder that is integrally provided at the tip of the shank. Attaching seat 211 is provided in the holder.

In the illustrations, a cutter and a bit have been shown as examples of the cutting tools, but the kinds of tools are not limited to cutters and bits. Examples of the cutting tools include a milling tool and a lathe. Typical examples thereof include a drill, an end mill, a cutter, and a bit. For example, in a case where the tool is a drill or an end mill, the shape of the tool main body is, for example, a columnar shape. For example, in a case where the tool is a cutter, the shape of the tool main body is, for example, a disc shape. In this case, a plurality of inserts is attached to the outer circumference of the tip of the tool main body. In a specific example of the structure of the tool main body, a plurality of attaching seats is provided on the outer circumference of the tip of the tool main body, and an insert is detachably mounted in each attaching seat. As the shape of each of the insert and the tool main body, a well-known shape may be appropriately adopted depending on the kind of the tool.

Figure 2A:
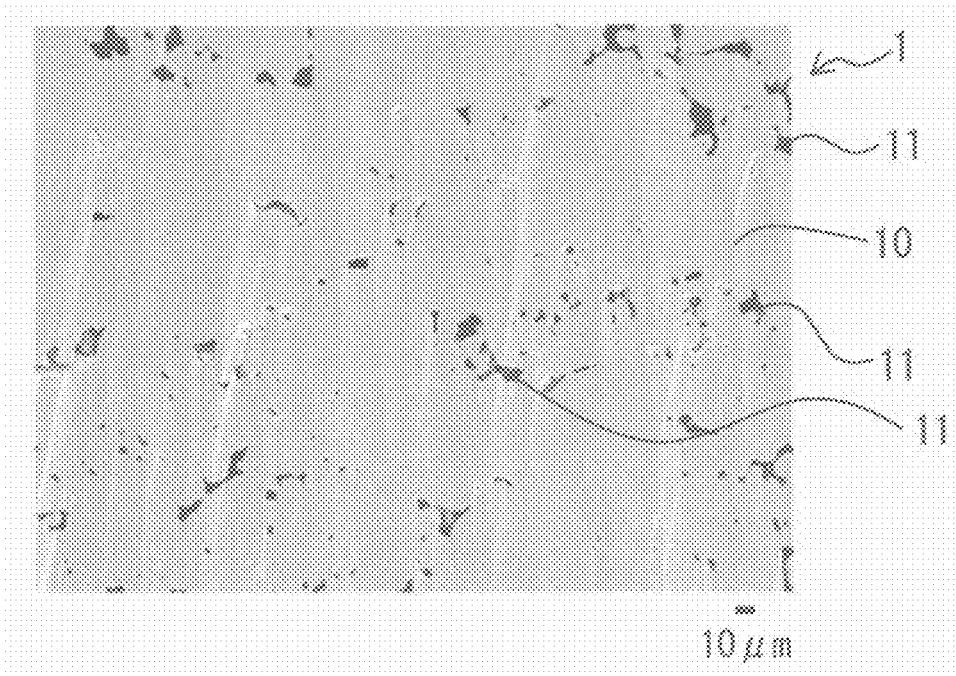
FIG. 2A is a micrograph showing a cross section of a sintered metal material for a sample No. 1 produced in Test Example 1.
Figure 2B:
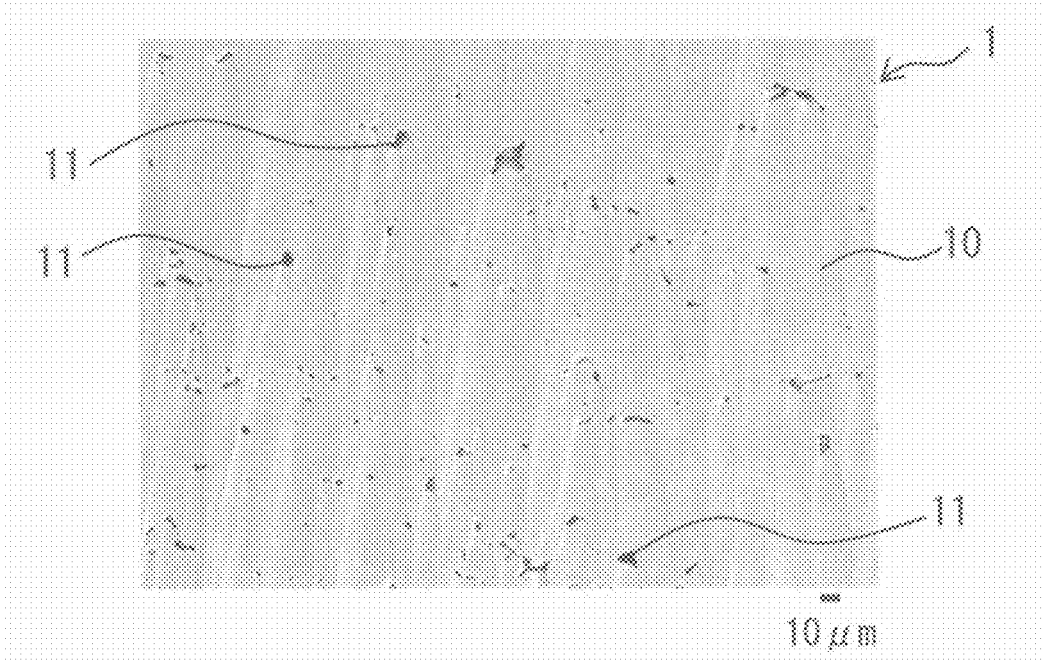
FIG. 2B is a micrograph showing a cross section of a sintered metal material for a sample No. 2 produced in Test Example 1.
Figure 2C:
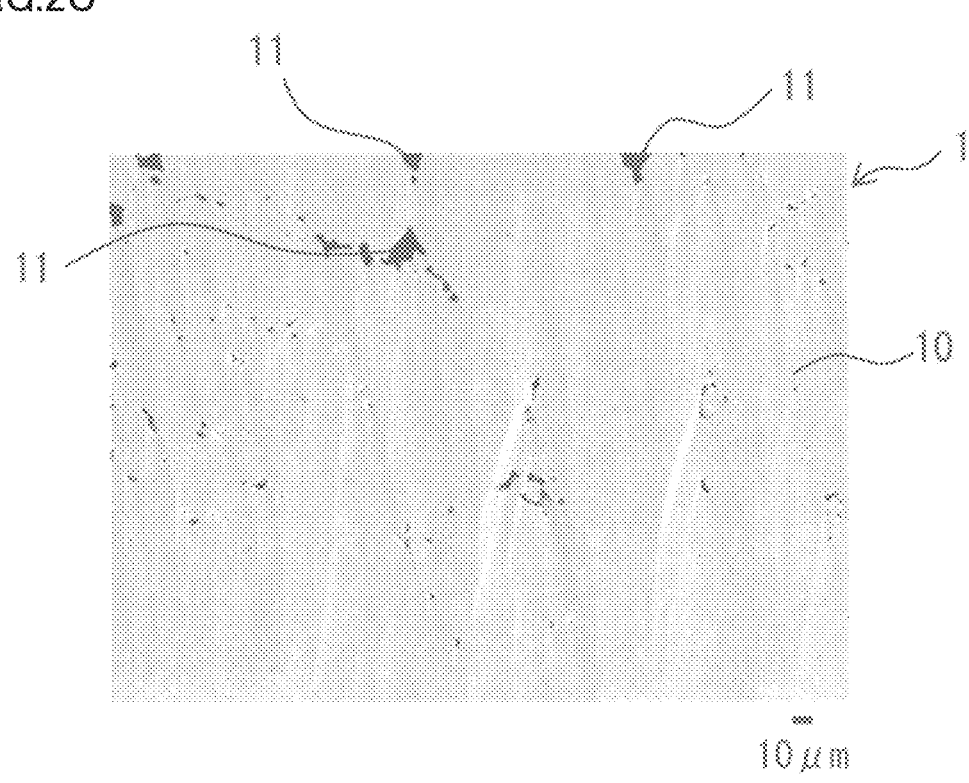
FIG. 2C is a micrograph showing a cross section of a sintered metal material for a sample No. 3 produced in Test Example 1.

One of the characteristics of tool main body 110 or 210 of the embodiment is that the tool main body is made of a sintered metal material. The sintered metal material configuring tool main body 110 or 210 will be described. FIGS. 2A, 2B and 2C are each a micrograph showing a cross section of a sintered metal material 1. Hereinafter, FIGS. 2A, 2B and 2C may be collectively referred to as FIG. 2.

[Sintered Metal Material]

Sintered metal material 1 shown in FIG. 2 is a sintered material mainly made of a metal. As shown in FIG. 2, sintered metal material 1 includes a parent phase 10 made of a metal and a plurality of pores 11 present in parent phase 10. In FIG. 2, granular regions indicated with a dark color, particularly, black, and white-edged granular regions are pores 11, and the remainder is parent phase 10.

Sintered metal material 1 has a plurality of pores 11 in parent phase 10 and is thus capable of effectively suppressing vibrations. Therefore, sintered metal material 1 is excellent in terms of vibration damping. Therefore, tool main bodies 110 and 210 shown in FIG. 1 are excellent in terms of vibration damping. In addition, in sintered metal material 1, it is possible to effectively release heat through the plurality of pores 11. Therefore, tool main bodies 110 and 210 are excellent in terms of a heat dissipation property. Sintered metal material 1 has pores 11 and is thus light-weight compared with cast materials and capable of reducing the weights of tool main bodies 110 and 210.

As shown in FIG. 2, in sintered metal material 1, the plurality of pores 11 is dispersed in parent phase 10 in an isotropic manner. Namely, in sintered metal material 1, pores 11 are not formed in strips along a specific direction. Therefore, in sintered metal material 1, cracks are unlikely to be generated along a specific direction. Furthermore, in sintered metal material 1 shown in FIG. 2, pores 11 on an arbitrary cross section are small. Tool main bodies 110 and 210 shown in FIG. 1 are each made of sintered metal material 1 and are thus excellent in terms of a strength in multiple directions. Therefore, tool main bodies 110 and 210 each have a stable strength.

Hereinafter, a preferable mode of sintered metal material 1 will be described with reference to, mainly, FIG. 2.
(Composition)

Examples of the metal that forms parent phase 10 include a variety of pure metals or alloys. Examples of the pure metals include Fe (iron), Ti (titanium), Cu (copper), Al (aluminum), and Mg (magnesium). Examples of the alloys include iron-based alloys, titanium-based alloys, copper-based alloys, aluminum-based alloys, and magnesium-based alloys. Ordinarily, alloys have a higher strength than pure metals. Therefore, sintered metal material 1 having parent phase 10 made of an alloy has a high strength. As the strength of sintered metal material 1 increases, it is possible to increase the strengths of tool main bodies 110 and 210 shown in FIG. 1.

The iron-based alloy contains additive elements, and the remainder is Fe and an impurity. The iron-based alloy contains Fe most. Examples of the additive elements include one or more elements selected from the group consisting of C (carbon), Ni (nickel), Mo (molybdenum) and B (boron). The iron-based alloy containing, in addition to Fe, the above-listed element, such as steel, has a high tensile strength. Sintered metal material 1 including parent phase 10 made of such an iron-based alloy is excellent in terms of a strength. Ordinarily, there is a tendency that as the content of each element increases, the strength is higher while the toughness further deteriorates. When the content of each element is not too large, it is possible to suppress the deterioration of the toughness while increasing the strength.

The iron-based alloy containing C, typically, carbon steel is excellent in terms of a strength. The C content is, for example, 0.1 mass % or more and 2.0 mass % or less. The C content may be 0.1 mass % or more and 1.5 mass % or less, furthermore, 0.1 mass % or more and 1.0 mass % or less or 0.1 mass % or more and 0.8 mass % or less. The content of each element is the mass proportion with respect to 100 mass % of the iron-based alloy.

Ni contributes to not only improvement in the strength but also improvement in the toughness. The Ni content is, for example, 0 mass % or more and 5.0 mass % or less. The Ni content may be 0.1 mass % or more and 5.0 mass % or less, furthermore, 0.5 mass % or more and 5.0 mass % or less, furthermore, 4.0 mass % or more or 3.0 mass % or less.

Mo and B contribute to improvement in the strength. In particular, Mo increases the strength.

The Mo content is, for example, 0 mass % or more and 2.0 mass % or less, furthermore, 0.1 mass % or more and 2.0 mass % or less and, furthermore, 1.5 mass % or more.

The B content is, for example, 0 mass % or more and 0.1 mass % or less and, furthermore, 0.001 mass % or more and 0.003 mass % or less.

Examples of other additive elements include Mn (manganese), Cr (chromium), and Si (silicon). The content of each of these elements is, for example, 0.1 mass % or more and 5.0 mass % or less.

The overall composition of sintered metal material 1 can be analyzed by, for example, energy-dispersive X-ray spectroscopy (EDX or EDS), high-frequency inductively coupled plasma optical emission spectroscopy (ICP-OES) or the like.

When sintered metal material 1 forming tool main bodies 110 and 210 shown in FIG. 1 has a high strength, tool main bodies 110 and 210 having a high strength can be obtained. Therefore, in view of the strengths of tool main bodies 110 and 210, parent phase 10 of sintered metal material 1 is preferably made of the iron-based alloy described above.
(Structure)

Sintered metal material 1 includes the plurality of pores 11 on an arbitrary cross section. Each pore 11 is preferably small. When each pore 11 is small, each pore 11 is less likely to serve as the origin of a crack. In sintered metal material 1, cracks attributed to pores 11 are unlikely to be generated, whereby it is possible to further increase the strengths of tool main bodies 110 and 210 shown in FIG. 1. In addition, each pore 11 is small, whereby the vibration damping of tool main bodies 110 and 210 improves. Details of measurement methods of the perimeter of the pore, the cross-sectional area of the pore, the maximum diameter of the pores and the relative density described below will be described in the section of test examples to be described below.
<<Perimeter of Pore>>

In sintered metal material 1, the average perimeter of pores 11 on an arbitrary cross section is preferably 100 μm or less. Here, the average perimeter of pores 11 is a value obtained by taking an arbitrary cross section from sintered metal material 1, obtaining the length of the contour of each pore 11 for the plurality of pores 11 on this cross section and averaging the lengths of the individual contours.

When the average perimeter of pores 11 is 100 μm or less, it can be said that a majority of pores 11 are pores 11 having a short perimeter. Pore 11 having a short perimeter has a small cross-sectional area. It can be said that as the average perimeter of pores 11 is shorter, the cross-sectional area of each pore 11 is smaller. When each pore 11 is small, pore 11 is unlikely to serve as the origin of a crack. Therefore, sintered metal material 1 in which the average perimeter of pores 11 is 100 μm or less is capable of further increasing the strengths of tool main bodies 110 and 210 shown in FIG. 1. In sintered metal material 1, since pores 11 are small, the vibration damping of tool main bodies 110 and 210 improves. In view of the strengths and vibration damping of tool main bodies 110 and 210, the average perimeter is preferably 90 μm or less, furthermore, 80 μm or less and, particularly, 70 μm or less.

There is a tendency that the average perimeter of pores 11 decreases as the relative density of sintered metal material 1 increases. For example, when the relative density of the powder compact, which serves as the material of sintered metal material 1, is increased by increasing the molding pressure in molding the powder compact, the relative density of sintered metal material 1 is increased. As a result, pores 11 become small, and the average perimeter is likely to become small. However, when the molding pressure is too large, it is difficult to remove the powder compact from a mold or the service life of the mold is likely to be shortened. Namely, when the molding pressure is too large, there is a concern that the productivity may deteriorate. In view of improving the productivity, the average perimeter may be, for example, 10 μm or more and, furthermore, 15 μm or more.

<<Cross-Sectional Area of Pore>>

In sintered metal material 1, the average cross-sectional area of pores 11 on an arbitrary cross section is preferably 500 μm$^2$ or less. Here, the average cross-sectional area of pores 11 is a value obtained by taking an arbitrary cross section from sintered metal material 1, obtaining the cross-sectional area of each pore 11 for the plurality of pores 11 on this cross section and averaging the cross-sectional areas of the pores.

When the average cross-sectional area of pores 11 is 500 μm$^2$ or less, it can be said that a majority of pores 11 are pores 11 having a small cross-sectional area. It can be said that as the average cross-sectional area of pores 11 is smaller, the cross-sectional area of each pore 11 is smaller. When each pore 11 is small, pore 11 is unlikely to serve as the origin of a crack. Therefore, sintered metal material 1 in which the average cross-sectional area of pores 11 satisfies 500 μm$^2$ or less is capable of further increasing the strengths of tool main bodies 110 and 210 shown in FIG. 1. In sintered metal material 1, since pores 11 are small, the vibration damping of tool main bodies 110 and 210 improves. In view of the strengths and vibration damping of tool main bodies 110 and 210, the average cross-sectional area is preferably 480 μm$^2$ or less, furthermore, 450 μm$^2$ or less, and, particularly, 430 μm$^2$ or less.

There is a tendency that the average cross-sectional area of pores 11 decreases as the relative density of sintered metal material 1 increases. In view of improving the productivity without too large molding pressure as described above, the average cross-sectional area may be, for example, 20 μm$^2$ or more and, furthermore, 30 μm$^2$ or more.

In sintered metal material 1, it is preferable that the average perimeter of pores 11 should be 100 μm or less and that the average cross-sectional area of pores 11 should be 500 μm$^2$ or less. In this case, it can be said that a majority of pores 11 are pores 11 having a small cross-sectional area and a short perimeter. Therefore, each pore 11 is unlikely to serve as the origin of a crack. As described above, in view of the strengths and vibration damping of tool main bodies 110 and 210, the average perimeter and the average cross-sectional area are preferably as small as possible.

<<Maximum Diameter of Pores>>

Furthermore, the average value of the maximum diameters of pores 11 is also preferably small. Here, the average value of the maximum diameters of pores 11 is a value obtained by taking an arbitrary cross section from sintered metal material 1, obtaining the maximum length of each pore 11 for the plurality of pores 11 on this cross section and averaging the maximum lengths of the pores.

The average value of the maximum diameters of pores 11 is, for example, 5 μm or more and 30 μm or less. When the average value is 30 μm or less, it can be said that a majority of pores 11 are short and small. Such pores 11 are more unlikely to serve as the origins of cracks. Therefore, sintered metal material 1 in which the average value of the maximum diameters of pores 11 satisfies 30 μm or less is capable of further increasing the strengths of tool main bodies 110 and 210 shown in FIG. 1. In sintered metal material 1, since pores 11 are generally small, the vibration damping of tool main bodies 110 and 210 further improves. In view of the strengths and vibration damping of tool main bodies 110 and 210, the average value is preferably 28 μm or less, furthermore, 25 μm or less and, particularly, 20 μm or less. When the average value is 5 μm or more, pores 11 are not too small. Therefore, a vibration suppression effect of pores 11 is likely to be obtained. In view of improving the productivity without too large molding pressure as described above, the average value may be 8 μm or more and, furthermore, 10 μm or more. In view of favorable balance between the strength and the productivity, the average value is, for example, 10 μm or more and 25 μm or less.

Furthermore, the maximum value of the maximum diameters of pores 11 is also preferably small. This is because each pore 11 is more unlikely to serve as the origin of a crack. The maximum value is preferably, for example, 30 μm or less, furthermore, 28 μm or less and, particularly, 25 μm or less.

The minimum value of the maximum diameters of pores 11 is, for example, 3 μm or more and 20 μm or less and, furthermore, 5 μm or more and 18 μm or less. The minimum value is preferably within the above-described range in view of improving the productivity as described above.

<<Shape of Pore>>

In a cross section of sintered metal material 1, the shape of pore 11 is typically an irregular shape. One of the reasons for the shape of pore 11 to be not an uncomplicated curve shape such as a round shape or an elliptical shape but an irregular shape is that, as described below, a dense powder compact is sintered at a relatively low temperature.

(Relative Density)

The relative density of sintered metal material 1 is preferably 85% or more and 99.9% or less. That is, sintered metal material 1 includes pores 11 in a range of 0.1% or more and 15% or less. When the proportion of pores 11 is within the above-described range, the number of pores 11 is small. Therefore, sintered metal material 1 is dense. The number of pores 11 is small, and thus pores 11 are unlikely to serve as the origins of cracks. Therefore, sintered metal material 1 having a relative density satisfying 85% or more is capable of increasing the strengths of tool main bodies 110 and 210 shown in FIG. 1. When the relative density of sintered metal material 1 is 99.9% or less, pores 11 are included, and accordingly, it is possible to improve the vibration damping or heat dissipation properties of the tool main bodies 110 and 210. In addition, the weight reduction of tool main bodies 110 and 210 is possible. Here, the relative density refers to, for example, a percentage of the area of parent phase 10 to the area of the cross section in an arbitrary cross section of sintered metal material 1 (see FIG. 2).

The relative density of sintered metal material 1 is preferably 90% or more, furthermore, 93% or more or 94% or more in view of the strengths of tool main bodies 110 and 210. In the case where further increase in the strengths of tool main bodies 110 and 210 is intended, the relative density is preferably 96% or more and particularly 96.5% or more. The relative density may be 97% or more or 98% or more. In view of improving the vibration damping and heat dissipation properties of tool main bodies 110 and 210 and reducing the weights of tool main bodies 110 and 210, the relative density is preferably 99.5% or less and, furthermore, 99% or less.

When the relative density of sintered metal material 1 is 99.9% or less and, particularly, 99.5% or less, too large molding pressure as described above can be prevented to improve the productivity. In view of improving the productivity, the relative density may be 99% or less.

In view of the balance between the strengths and the vibration damping or the like of tool main bodies 110 and 210 and view of the productivity, the relative density of sintered metal material 1 is, for example, 93% or more and 99.5% or less and, furthermore, 94% or more and 99% or less. When the relative density is 93% or more, the number of pores 11 is smaller, and accordingly, pores 11 are more unlikely to serve as the origins of cracks. Therefore, it is possible to further increase the strengths of tool main bodies 110 and 210. When the relative density is 99.5% or less, pores 11 are included as appropriate, and accordingly, it is possible to further improve the vibration damping or heat dissipation properties of the tool main bodies 110 and 210. In addition, it is possible to further reduce the weights of tool main bodies 110 and 210.

(Applications)

Tool main bodies 110 and 210 of the embodiment can be used as cutting tools. Examples of the cutting tools include a milling tool, and a lathe. Typical examples thereof include a drill, an end mill, a cutter, and a bit.

(Main Effects)

Tool main bodies 110 and 210 of the embodiment are made of sintered metal material 1. Sintered metal material 1 is capable of effectively suppressing vibrations with the plurality of pores 11. Sintered metal material 1 includes the plurality of pores 11, but pores 11 are not oriented in a specific direction. Therefore, tool main bodies 110 and 210 of the embodiment are excellent in terms of vibration damping and have a stable strength. In a case where tool main bodies 110 and 210 are used as a cutting tool, it is possible to suppress chatter or the like that is generated during processing since tool main bodies 110 and 210 are excellent in terms of vibration damping. Therefore, the processing accuracy of the cutting tool improves. In addition, tool main bodies 110 and 210 have a stable strength, and variations in the strength in multiple directions are small. Therefore, even when cutting is performed in multiple directions with a single cutting tool in which main body 110 or 210 is used, it is possible to suppress the generation of a crack along a specific direction in tool main body 110 or 210.

Additionally, when tool main bodies 110 and 210 are made of sintered metal material 1, it is possible to reduce the weights of tool main bodies 110 and 210. In sintered metal material 1, it is possible to effectively release heat through the plurality of pores 11. Therefore, tool main bodies 110 and 210 are also excellent in terms of a heat dissipation property.

Furthermore, sintered metal material 1 described above has a relative density of 85% or more, the number of pores 11 is small, and furthermore, pores 11 are small on an arbitrary cross section. Therefore, in sintered metal material 1, pores 11 are unlikely to serve as the origins of cracks, and the strength is excellent. Therefore, when tool main bodies 110 and 210 are made of sintered metal material 1, it is possible to further increase the strengths of tool main bodies 110 and 210. In addition, since pores 11 are small in sintered metal material 1, the vibration damping of tool main bodies 110 and 210 improves.

[Method for Producing a Tool Main Body]

Tool main bodies 110 and 210 of the embodiment can be produced by, for example, a method for producing a tool main body including the following steps.

First step: molding a powder compact by compressing a raw material powder containing a metal powder.

Second step: mechanically processing the powder compact into a shape of a tool main body to which an insert is attachable.

Third step: sintering the powder compact processed into the shape of the tool main body.

A method for producing a tool main body of the embodiment includes the first to third steps described above. According to this production method, it is possible to produce a tool main body that is made of a sintered metal material. When a tool main body is made of a sintered metal material, the tool main body obtained can be excellent in terms of vibration damping and having a stable strength as described above. Furthermore, in a case where the tool main body is made of a sintered metal material, it is possible to reduce the weight of the tool main body or improve the heat dissipation property.

Hereinafter, each step will be described.

(First Step: Molding Step)

<Preparation of Raw Material Powder>

The raw material powder contains a metal powder. The metal powder is preferably made of a metal that is neither too soft nor too hard. When the metal powder is not too hard, the metal powder is likely to plastically deform by compression. Therefore, a dense powder compact having a relative density of 85% or more is likely to be obtained. When the metal powder is not too soft, a powder compact having a relative density of 99.9% or less, that is, a powder compact including pores is likely to be obtained.

The raw material powder preferably contains a metal powder having a composition appropriate for the composition of the parent phase of the sintered metal material. In addition, the hardness of the metal powder is preferably adjusted depending on the composition of the metal powder. The hardness of the metal powder is adjusted by, for example, adjusting the composition of the metal powder, performing a heat treatment on the metal powder, or adjusting a heat treatment condition for the metal powder. Regarding the composition of the metal powder, the item (composition) in the section [sintered metal material] described above may be referred to.

For example, in a case where the parent phase of the sintered metal material is made of an iron-based material, the raw material powder contains a powder made of an iron-based material. Hereinafter, a powder made of an iron-based material may be referred to as "iron-based powder". The iron-based material is pure iron or an iron-based alloy. When the iron-based material is particularly an iron-based alloy, a sintered metal material having a high strength can be obtained as described above. The iron-based powder can be produced by, for example, a water atomization method, or a gas atomization method.

Vickers hardness Hv of the iron-based powder is preferably 80 or more and 200 or less. The use of the iron-based powder having Vickers hardness Hv within the above-described range makes it easy to obtain a dense powder compact as described above. The iron-based powder having Vickers hardness Hv of 80 or more is not too soft. The use of a raw material powder containing such an iron-based powder makes it possible to obtain a powder compact including pores as described above. The iron-based powder having Vickers hardness Hv of 200 or less is not too hard. The use of a raw material powder containing such an iron-based powder makes it possible to obtain a dense powder compact as described above. Vickers hardness Hv may be 90 or more and 190 or less and, furthermore, 100 or more and 180 or less or 110 or more and 150 or less.

For a case where the parent phase of the sintered metal material is made of an iron-based alloy, examples of the raw material powder includes the followings.

(1) The raw material powder contains a first alloy powder. The first alloy powder is made of an iron-based alloy having the same composition as the iron-based alloy forming the parent phase.

(2) The raw material powder contains a second alloy powder and a first element powder. The second alloy powder is made of an iron-based alloy containing at least one additive element among the additive elements that are contained in the iron-based alloy forming the parent phase. The first element powder is a powder made of the remainder additive elements of the additive elements.

(3) The raw material powder contains the second alloy powder and a third alloy powder. The third alloy powder is made of an iron-based alloy containing the remainder additive elements of the additive elements.

(4) The raw material powder contains a pure iron powder and a second element powder. The second element powder is a powder made of all of the additive elements in the iron-based alloy forming the parent phase.

Specific examples of the raw material powder shown in (2) will be described. For example, in a case where the parent phase of the sintered metal material is an iron-based alloy containing C, Ni and Mo as additive elements with Fe and an impurity as the remainder, the raw material powder may contain the following second alloy powder and first element powder. The second alloy powder is a powder containing the above-described additive elements except C, that is, Ni and Mo, with Fe and an impurity as the remainder. The first element powder is a carbon powder. For example, the iron-based alloy may contain at least one element of Mo in an amount of 0.1 mass % or more and 2.0 mass % or less of and Ni in an amount of 0.5 mass % or more and 5.0 mass % or less. As the iron-based alloy containing Mo or Ni within the above-described range, a variety of compositions having Vickers hardness Hv of 80 or more and 200 or less are present. Therefore, a powder made of the iron-based alloy is likely to be obtained.

The sizes of the raw material powder can be selected as appropriate. The average particle diameter of the above-described alloy powder or pure iron powder is, for example, 20 μm or more and 200 μm or less and, furthermore, 50 μm or more and 150 μm or less. The average particle diameter of a third powder (excluding a carbon powder) is, for example, approximately 1 μm or more and 200 μm or less. The average particle diameter of the carbon powder is, for example, approximately 1 μm or more and 30 μm or less. The average particle diameter mentioned herein is a particle diameter (D50) at which the cumulative volume reaches 50% in a volume particle size distribution measured with a laser diffraction-type particle size distribution analyzer.

<Molding>

As the relative density of the powder compact increases, a dense sintered metal material having a higher relative density is obtained. Therefore, in the end, a tool main body made of a dense sintered metal material having a high relative density is obtained. In a dense sintered metal material, the number of pores is small, and furthermore, the pores are likely to be small. The relative density of the powder compact is 85% or more and 99.9% or less. When a dense powder compact having a relative density of 85% or more is used as a material, a dense sintered metal material having a relative density of 85% or more and 99.9% or less can be obtained even when the sintering temperature is a relatively low temperature such as lower than the liquidus temperature. In addition, the powder compact includes pores in a range of 0.1% or more and 15% or less. However, each pore is small due to compression. When the above-described dense powder compact is sintered at a relatively low temperature, a dense sintered metal material including small pores can be obtained in which the number of pores is small. So to speak, a sintered metal material in which the sizes and amount of pores included in the powder compact are substantially maintained can be obtained. In this sintered metal material, the number of the pores is small, and the pores are small. Accordingly, the pores are unlikely to serve as the origins of cracks, and the strength is excellent. Therefore, it is possible to increase the strength of the tool main body.

The relative density of the powder compact may be 90% or more and, furthermore, 93% or more, 94% or more, 96% or more, 96.5% or more, 97% or more or 98% or more. On the other hand, in view of improving the vibration damping and heat dissipation property of the tool main body and reducing the weight of the tool main body, the sintered metal material preferably includes pores as appropriate. The relative density of the powder compact may be 99.5% or less and, furthermore, 99.4% or less, 99.2% or less or 99% or less. In view of the balance between the strength and the vibration damping or the like of the tool main body, the relative density of the powder compact is, for example, 93% or more and 99.5% or less and, furthermore, 94% or more and 99% or less.

For the molding of the powder compact, typically, a mold pressing device may be used. For the molding of the powder compact, for example, a cold isostatic pressing (CIP) device can also be used. The shape of the mold is preferably selected depending on the shape of the powder compact.

A lubricant may be applied to the inner circumferential surface of the mold. The application of the lubricant makes it possible to suppress the seizure of the powder compact on the mold. Therefore, the shape accuracy or dimension accuracy is excellent, and furthermore, a dense powder compact is likely to be obtained. Examples of the lubricant include higher fatty acids, metal soaps, fatty acid amides, and higher fatty acid amides.

As the molding pressure increases, a dense powder compact having a higher relative density is likely to be obtained. The molding pressure is, for example, 1560 MPa or more. The molding pressure may be 1660 MPa or more, 1760 MPa or more, 1860 MPa or more or 1960 MPa or more. When the molding pressure is set to be low, it is easy to remove the powder compact from the mold, and the service life of the mold is long, which improve the productivity.

The shape of the powder compact may be a shape close to the shape of the tool main body or may be a shape different from the shape of the tool main body. Examples of the shape of the powder compact include simple shapes such as a columnar shape, a cylindrical shape and a rectangular shape. When the shape of the powder compact is a simple shape, it is easy to highly accurately mold a dense powder compact even when the molding pressure is set to be low to a certain extent. In addition, when the shape is simple, the mold cost can also be reduced.

(Second Step: Processing Step)

The above-described powder compact is processed into the shape of the tool main body. Typical examples of a mechanical process that is performed on the powder compact include cutting. Examples of the cutting include milling and turning. The powder compact before sintering still remains as a molded metal powder and is thus easily cut compared with the sintered metal material after sintering or cast materials. Therefore, the processing time is short, and furthermore, the service life of a processing tool can also be extended compared with a case where the sintered metal material or a cast material is processed. Therefore, when the powder compact is processed into the shape of the tool main body, the tool main body can be produced with favorable productivity. In addition, since cutting can be easily performed, a tool main body having an excellent shape accuracy or dimension accuracy is likely to be obtained. Therefore, a tool main body having a high shape accuracy or dimension accuracy can be obtained, and thus the yield can be increased.

A process that is performed on the powder compact is a process that processes the powder compact into the shape of the tool main body. Examples of this process include the formation of an attaching seat to which an insert is attachable at a predetermined site.

When the relative density of the powder compact is somewhat high, cutting is easy to perform. In particular, when the relative density of the powder compact is 85% or more, it is possible to favorably perform cutting even when, for example, the feed amount is set to be large. Therefore, a tool main body having an excellent shape accuracy or dimension accuracy is likely to be obtained. Due to this, the yield improves. In addition, when the feed amount is set to be large, the cutting time is short. As described above, cutting performed on the powder compact contributes to improvement in the productivity of the tool main body.

(Third Step: Sintering Step)

The above-described powder compact processed into the shape of the tool main body is sintered. The sintering temperature is preferably set to lower than the liquidus temperature. Specifically, in a case where the metal powder is an iron-based powder, the sintering temperature is 1000° C. or more and lower than 1300° C. The sintering temperature is lower than the liquidus temperature and a relatively low temperature. Therefore, compared with a case where the powder compact is sintered at a high temperature at which a liquid phase is formed, it is possible to reduce the heat energy. Furthermore, when sintering temperature is a relatively low temperature, it is possible to suppress the formation of coarse pores. Therefore, a sintered metal material in which pores are small is likely to be obtained. Typically, a sintered metal material is obtained which has an average perimeter of pores of 100 μm or less or an average cross-sectional area of pores of 500 μm$^2$ or less. For example, when a dense powder compact having a relative density of 85% or more is sintered at a relatively low temperature, a dense sintered metal material including small pores can be obtained in which the number of pores is small. In addition, during low-temperature sintering, the deterioration of the shape accuracy or the deterioration of the dimension accuracy attributed to heat shrinkage is unlikely to be caused, compared with high-temperature sintering. Therefore, a tool main body having an excellent shape accuracy or dimension accuracy is likely to be obtained, and the yield can be increased. As described above, sintering the powder compact at a relatively low temperature contributes to improvement in the productivity of the tool main body.

The sintering temperature and the sintering time are preferably adjusted depending on the composition or the like of the raw material powder. In a case where an iron-based powder is used, the sintering temperature is 1000° C. or more and lower than 1300° C.

As the sintering temperature decreases, the amount of heat shrinkage is likely to decrease. Therefore, a tool main body having an excellent shape accuracy or dimension accuracy is likely to be obtained. In view of reduction in the heat energy and improvement in the shape accuracy or dimension accuracy, the sintering temperature is preferably 1250° C. or less and, furthermore, lower than 1200° C.

As the sintering temperature is higher within the above-described range, the sintering time is likely to be shorter. Due to this, the productivity can be enhanced. In view of shortening the sintering time, the sintering temperature may be 1050° C. or more and, furthermore, 1100° C. or more.

In view of reduction in the heat energy and the balance between a favorable accuracy and the shortening of the sintering time, the sintering temperature is, for example, 1100° C. or more and lower than 1200° C.

The sintering time is, for example, 10 minutes or more and 150 minutes or less.

Examples of the atmosphere during the sintering include a nitrogen atmosphere and a vacuum atmosphere. The vacuum atmosphere is, for example, 10 Pa or less. In the nitrogen atmosphere or the vacuum atmosphere, the oxygen concentration in the atmosphere is low, and it is thus easy to suppress the oxidation of the sintered metal material.

Other Steps

The above-described method for producing a tool main body may include, after the third step, performing a heat treatment on the sintered metal material obtained by sintering the powder compact. For example, in the case of a sintered metal material for which the above-described iron-based powder is used, examples of the heat treatment include a carburizing treatment, quenching and tempering, carburization, quenching and tempering. Conditions for the heat treatment are preferably adjusted as appropriate depending on the composition of the sintered metal material. As the heat treatment conditions, well-known conditions can be adopted.

The above-described method for producing a tool main body may include, after the third step, performing finishing on the sintered metal material. Examples of the finishing include polishing and grinding. The finishing makes it possible to obtain a tool main body having excellent surface properties or a tool main body having a higher shape accuracy or dimension accuracy.

Main Effects

The method for producing a tool main body of the embodiment enables the production of a tool main body that is made of a sintered metal material. When a tool main body is made of a sintered metal material, the tool main body obtained can be excellent in terms of vibration damping and have a stable strength. Particularly, in the production method of the embodiment, since the powder compact before sintering is processed into the shape of the tool main body, the tool main body can be produced with favorable productivity. For example, the tool main body of the above-described embodiment can be produced with favorable productivity.

Test Example 1

Powder compacts having different relative densities were sintered at a variety of temperatures to produce sintered metal materials, and the structures of the sintered metal materials were investigated.

The sintered metal materials were produced as described below.

A powder compact is produced by using a raw material powder.

The obtained powder compact is sintered.

After the sintering, carburizing, quenching and tempering are sequentially performed.

The raw material powder is a powder mixture containing an alloy powder made of the following iron-based alloy and a carbon powder.

The iron-based alloy contains 2 mass % of Ni, 0.5 mass % of Mo and 0.2 mass % of Mn with Fe and an impurity as the remainder. Vickers hardness Hv of this iron-based alloy is 120, which falls within a range of 80 or more and 200 or less.

The content of the carbon powder is 0.3 mass % when the total mass of the powder mixture is regarded as 100 mass %.

The average particle diameter (D50) of the alloy powder is 100 μm. The average particle diameter (DSO) of the carbon powder is 5 μm.

The raw material powder was compressed to mold an annular powder compact. The powder compact was molded by mold pressing. The dimensions of the powder compact are 16 mm in inner diameter, 30 mm in outer diameter and 8 mm in thickness.

The powder compact was molded at a molding pressure selected from a range of 1560 MPa to 1960 MPa such that the relative density (%) of the powder compact for each sample reached approximately 85% to 99%. As the molding pressure increases, a powder compact having a higher relative density is obtained. The density (g/cm$^3$) and relative density (%) of the powder compact for each sample are shown in Table 1.

The density (g/cm$^3$) of the powder compact was obtained by measuring the mass of the powder compact and dividing this mass by the volume of the powder compact. The obtained density is the apparent density of the powder compact. The relative density (%) of the powder compact was obtained by dividing the apparent density of the powder compact by the true density of the powder compact. The true density was 7.8 g/cm$^3$. The true density was obtained from the composition of the raw material powder.

The produced powder compact was sintered under the following conditions. After the sintering, carburizing and quenching were performed under the following conditions and then tempering was performed, thereby obtaining a sintered metal material for each sample.

(Sintering Conditions)

The sintering temperature (° C.) is any of 1130° C., 1450° C. and 1480° C. The sintering temperature of each sample is shown in Table 1. The holding time is 20 minutes. The atmosphere is a nitrogen atmosphere.

(Carburizing and Quenching)

930° C.×90 minutes, carbon potential of 1.4 mass %⇒850° C.×30 minutes⇒oil cooling (Tempering)

200° C.×90 minutes

An annular sintered metal material that was 16 mm in internal diameter, 30 mm in outer diameter and 8 mm in thickness was obtained as described above. The parent phase of this sintered metal material is made of the following iron-based alloy. This iron-based alloy contains 2 mass % of Ni, 0.5 mass % of Mo, 0.2 mass % of Mn and 0.3 mass % of C with Fe and an impurity as the remainder. The component analysis of the sintered metal material was performed using ICP.

(Description of Samples)

The sintered metal materials for samples No. 1 to No. 3 were obtained by sintering a powder compact having a relative density of 93% or more at a low temperature of 1130° C., which is lower than the liquidus temperature. FIGS. 2A to 2C are sequentially SEM images of arbitrary cross sections of the sintered metal materials for the samples No. 1 to No. 3 observed with a scanning electron microscope (SEM).

Figure 8A:
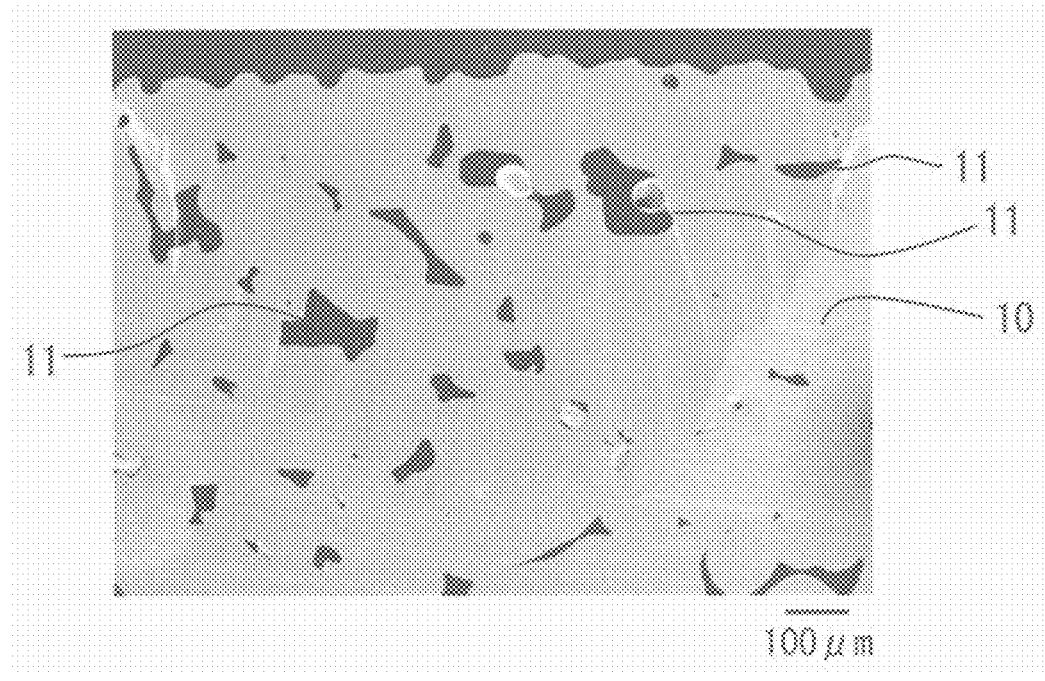
FIG. 8A is a micrograph showing a cross section of a sintered metal material for a sample No. 101 produced in Test Example 1.
Figure 8B:
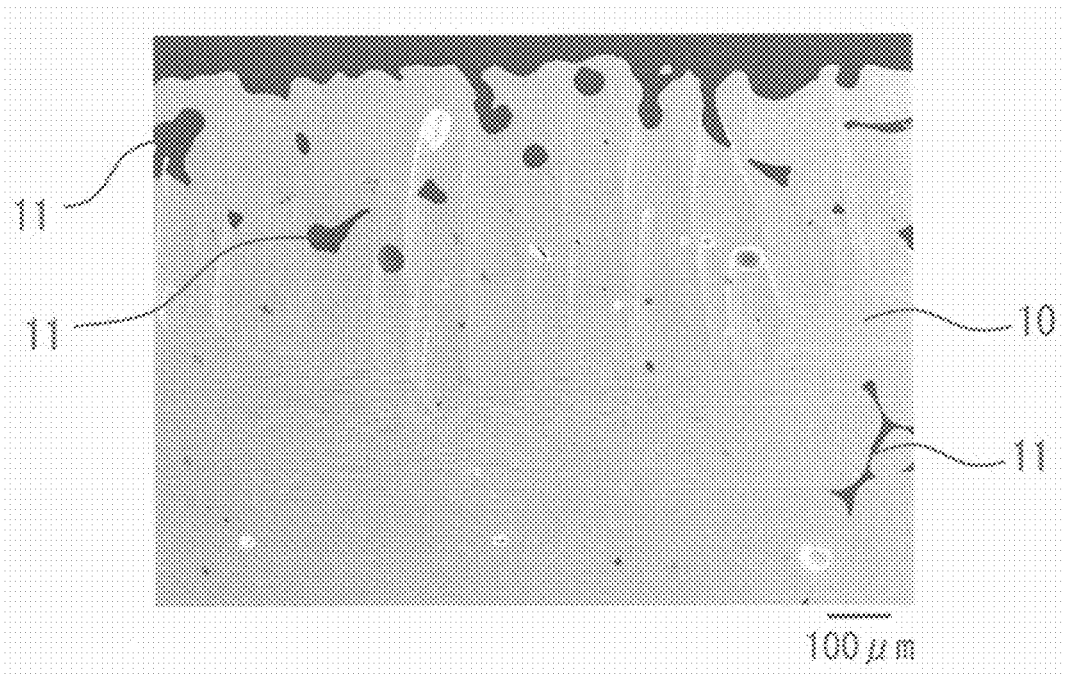
FIG. 8B is a micrograph showing a cross section of a sintered metal material for a sample No. 102 produced in Test Example 1.
Figure 8C:
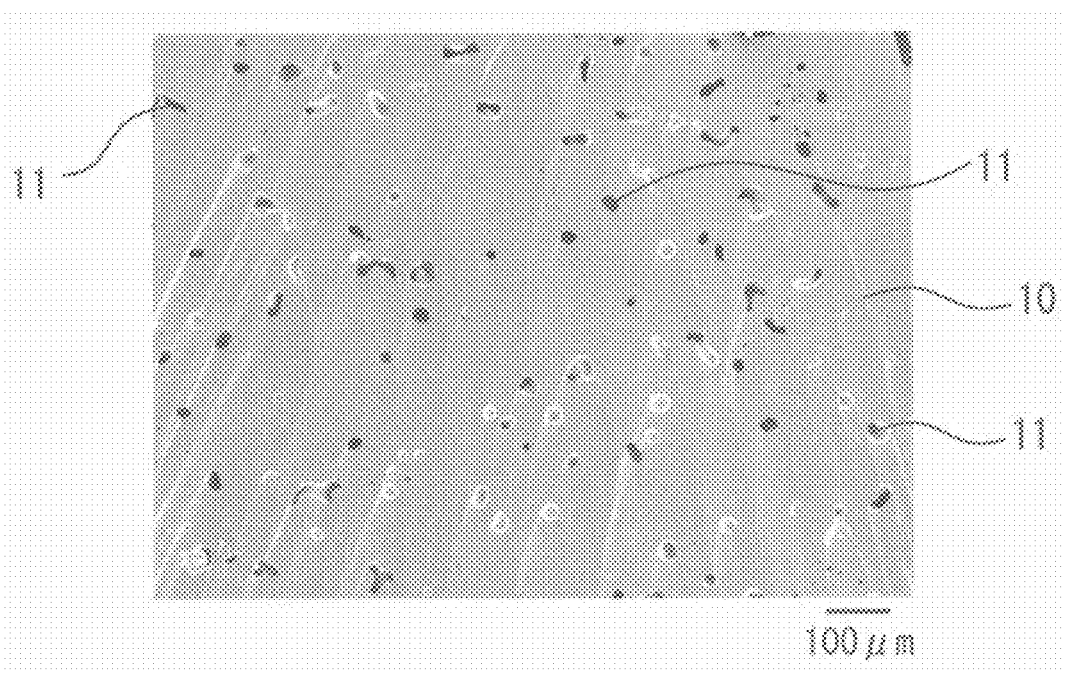
FIG. 8C is a micrograph showing a cross section of a sintered metal material for a sample No. 103 produced in Test Example 1.

The sintered metal materials for samples No. 101 to No. 103 were obtained by sintering a powder compact having a relative density of less than 93% at a high temperature of a liquidus temperature, that is, 1450° C. or 1480° C. FIGS. 8A to 8C are sequentially SEM images of arbitrary cross sections of the sintered metal materials for the samples No. 101 to No. 103 observed with SEM. In FIGS. 8A and 8B, black regions in the upper portion are backgrounds. Hereinafter, FIGS. 8A to 8C may be collectively referred to as FIG. 8.

(Density and Relative Density)

The density (g/cm$^3$) and relative density (%) of the sintered metal material of each produced sample were investigated. The results are shown in Table 1.

The density (g/cm$^3$) of the sintered metal material was obtained using the result of the above-described component analysis.

The relative density (%) of the sintered metal material is obtained as described below.

A plurality of cross sections is taken from the sintered metal material. Each cross section is observed with a microscope such as SEM or an optical microscope. This observation image is image-analyzed, and the area proportion of the parent phase except pores is regarded as the relative density.

In a case where the sintered metal material is a tubular body or a columnar body, cross sections are taken from a region on each end surface side in the sintered metal material and a region in the vicinity of the center of the length along the axial direction in the sintered metal material, respectively. In the case of the present example, the sintered metal material is a tubular body. Each end surface in the sintered metal material is an annular surface. The axial direction in the sintered metal material corresponds to the thickness direction.

Though depending on the length, that is, the thickness of the sintered metal material, the region on the end surface side is, for example, a region that is 3 mm or less from the surface of the sintered metal material toward the inside. Though depending on the length of the sintered metal material, the region in the vicinity of the center is, for example, a region that is up to 1 mm from the center of the length toward each end surface side (a region of a total of 2 mm). The cut surface is a plane intersecting with the axial direction, typically, a plane orthogonal to the axial direction.

A plurality of observation visual fields is taken from each cross section. The number of the observation visual fields is, for example, 10 or more. The sizes (area) of one observation visual field are, for example, 500 μm×600 μm=300,000 μm$^2$. In a case where a plurality of the observation visual fields is taken from one cross section, it is preferable that this cross section should be evenly divided and that an observation visual field should be taken from each divided region.

Image processing is performed on an observation image from each observation visual field, and a region made of a metal is extracted from the processed image. It can be said that the region made of a metal is a region of the parent phase excluding pores. The image processing is, for example, a binarization treatment. The area of the extracted region made of a metal is obtained. Furthermore, the proportion of the area of the region made of a metal in the area of the observation visual field is obtained. This proportion of the area is regarded as the relative density of each observation visual field. The obtained relative densities of the plurality of observation visual fields are averaged. This average value is used as the relative density (%) of the sintered metal material.

Here, 10 or more observation visual fields are taken from each of the regions on the two end surface sides. In addition, 10 or more observation visual fields are taken from the region in the vicinity of the center. The relative density of each observation visual field is obtained, and a total of 30 or more of the relative densities are averaged. This average value is used as the relative density (%) of the sintered metal material.

The relative density of the powder compact may be obtained in the same manner as for the relative density of the sintered metal material. In a case where the powder compact is molded by mold pressing as in the present example, cross sections of the powder compact are taken from a region in the vicinity of the center of the length along the pressurization axial direction in the powder compact and regions on the end surface sides positioned at both end portions in the pressurization axial direction, respectively. The cut surface is a plane intersecting with the pressurization axial direction, typically, a plane orthogonal to the pressurization axial direction.

(Structural Observation)

An arbitrary cross section is taken from the sintered metal material of each produced sample, and the sizes of pores were investigated.

The sizes of the pores are obtained as described below.

An arbitrary cross section is taken from the sintered metal material of each sample. The cross section is observed with SEM, and at least one visual field is taken from the cross section. The sizes of pores are measured by extracting a total of 50 pores or more.

Here, the size of the visual field was adjusted such that 50 pores or more were present in one visual field. The sizes of one visual field are approximately 355 $\mu m \times$ approximately 267 $\mu m$.

In the visual field, pores are extracted. As shown in FIGS. 2 and 8, the color of parent phase 10 and the color of pore 11 are different from each other. Therefore, pores are extracted by performing image processing such as a binarization treatment on the SEM image. A commercially available image analysis system, commercially available image analysis software or the like may be used for the extraction of pores, the measurement of the sizes of the pores, the extraction of the region of a metal that is used for the measurement of the relative density described above, the measurement of the area of the region, or the like.

<Cross-Sectional Area>

The cross-sectional area of each pore extracted from the SEM image is obtained. Furthermore, the average value of the cross-sectional areas of the pores is obtained. The average value of the cross-sectional areas is obtained by obtaining the total of the cross-sectional areas of 50 pores or more extracted from one visual field and dividing the total by the number of the pores. The average value of the cross-sectional areas is used as the average cross-sectional area ($\mu m^2$). The average cross-sectional area is shown in Table 1. In addition, the number of extracted pores (N number) is shown in Table 1.

<Perimeter>

The perimeter of each pore extracted from the SEM image is obtained. The perimeter of a pore is the length of the contour of the pore. Furthermore, the average value of the perimeters of the pores is obtained. The average value of the perimeters is obtained by obtaining the total of the perimeters of 50 or more extracted pores and dividing this total by the number of the pores. The average value of the perimeters is used as the average perimeter ($\mu m$). The average perimeter is shown in Table 1.

<Maximum Diameter>

The maximum diameter of each pore extracted from the above-described SEM image is obtained. Furthermore, the average value of the maximum diameters is obtained. The average value of the maximum diameters is obtained by obtaining the total of the maximum diameters of 50 or more extracted pores and dividing the total by the number of the pores. The average value ($\mu m$) of the maximum diameters is shown in Table 1. The maximum diameter of the pore is obtained as described below. On the SEM image, the contour of each pore is sandwiched by two parallel lines, and the gap between these two parallel lines is measured. The gap is the distance in a direction orthogonal to the parallel lines. A plurality of sets of parallel lines in arbitrary directions is taken, and the gaps are measured. The maximum value of the plurality of measured gaps is defined as the maximum length of each pore, and this maximum length is used as the maximum diameter.

The maximum value and minimum value of the maximum diameters of the pores were also obtained. Here, the maximum value ($\mu m$) of the maximum diameters of the 50 pores or more described above is shown in Table 1. In addition, the minimum value ($\mu m$) of the maximum diameters of the 50 pores or more described above is shown in Table 1.

<Roundness>

Furthermore, the roundness of the pore was obtained. In order to obtain the roundness, first, the diameter of a circumscribed circle and the diameter of an inscribed circle are obtained for each of all pores present in four or more visual fields in an arbitrary cross section of the sintered metal material. Next, the ratio "diameter of circumscribed circle of pore/diameter of inscribed circle of pore" is obtained for each pore. The roundness is defined as the average of the ratios in all pores. The diameters of the circumscribed circle and the inscribed circle can be obtained with commercially available image analysis software. For the observation of the cross section, SEM is used. The magnification for each visual field is set to 450×. The sizes of each visual field are set to 0.4 mm×0.6 mm. The roundness is shown in Table 1.

TABLE 1

| Sample NO. | | 101 | 102 | 103 | 1 | 2 | 3 |
|---|---|---|---|---|---|---|---|
| Powder compact | Density (g/cm³) | 6.85 | 7.09 | 7.09 | 7.33 | 7.56 | 7.70 |
| | Relative density (%) | 87.8 | 90.9 | 90.9 | 94.0 | 96.9 | 98.7 |
| | Sintering temperature (° C.) | 1480 | 1480 | 1450 | 1130 | 1130 | 1130 |

TABLE 1-continued

| Sample NO. | | 101 | 102 | 103 | 1 | 2 | 3 |
|---|---|---|---|---|---|---|---|
| Sintered metal material | Density (g/cm³) | 7.44 | 7.50 | 7.30 | 7.35 | 7.57 | 7.71 |
| | Relative density (%) | 95.4 | 96.2 | 93.6 | 94.2 | 97.1 | 98.8 |
| | Average cross-sectional area (μm²) | 25373 | 6298 | 6933 | 424 | 298 | 259 |
| | Average perimeter (μm) | 526 | 202 | 260 | 64 | 53 | 45 |
| | Maximum diameter (average value) (μm) | 129 | 60 | 74 | 18 | 15 | 14 |
| | Maximum diameter (maximum value) (μm) | 198 | 81 | 98 | 24 | 20 | 18 |
| | Maximum diameter (minimum value) (μm) | 78 | 45 | 55 | 13 | 11 | 9 |
| | Roundness | 3.68 | 4.42 | 3.45 | 2.99 | 3.19 | 3.26 |
| | N number (pores) | 59 | 60 | 173 | 169 | 212 | 162 |

FIGS. 3 to 7 are graphs, for the sintered metal material of each sample, sequentially showing the average cross-sectional area (μm²) of the pores, the average perimeter (μm) of the pores, the average value (μm) of the maximum diameters of the pores, the maximum value (μm) of the maximum diameters of the pores and the minimum value (μm) of the maximum diameters of the pores. The horizontal axis of each graph indicates the sample numbers. The vertical axis of each graph indicates the average cross-sectional area (μm²) of the pores in FIG. 3, the average perimeter (μm) of the pores in FIG. 4, the average value (μm) of the maximum diameters of the pores in FIG. 5, the maximum value (μm) of the maximum diameters of the pores in FIG. 6 and the minimum value (μm) of the maximum diameters of the pores in FIG. 7.

Figure 3:
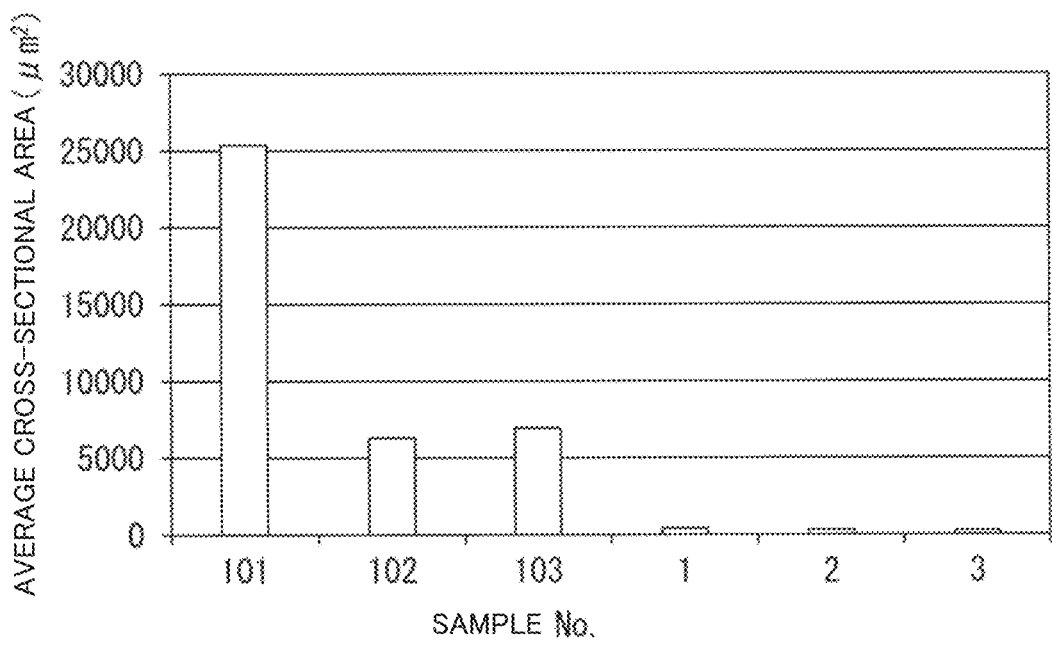
FIG. 3 is a graph showing an average cross-sectional area of pores in the sintered metal material of each sample produced in Test Example 1.

As shown in Table 1 and FIG. 3, it is found that, in the sintered metal materials for the samples No. 1 to No. 3, the average cross-sectional areas of the pores are small compared with those in the sintered metal materials for the samples No. 101 to No. 103. Hereinafter, the sintered metal materials for the samples No. 1 to No. 3 will be referred to as the samples of high-density molding, and the sintered metal materials for the samples No. 101 to No. 103 will be referred to as the samples of high-temperature sintering. Quantitatively, the average cross-sectional areas of the pores in the samples of high-density molding are 500 μm² or less and, in the present example, particularly 450 μm² or less. In the sintered metal materials for the samples No. 2 and No. 3, in which the relative density of the sintered metal material is 96.5% or more, the average cross-sectional areas of the pores are 400 μm² or less, and particularly 300 μm² or less. In the sintered metal materials for the samples No. 2 and No. 3, the average cross-sectional areas of the pores are smaller.

Figure 4:
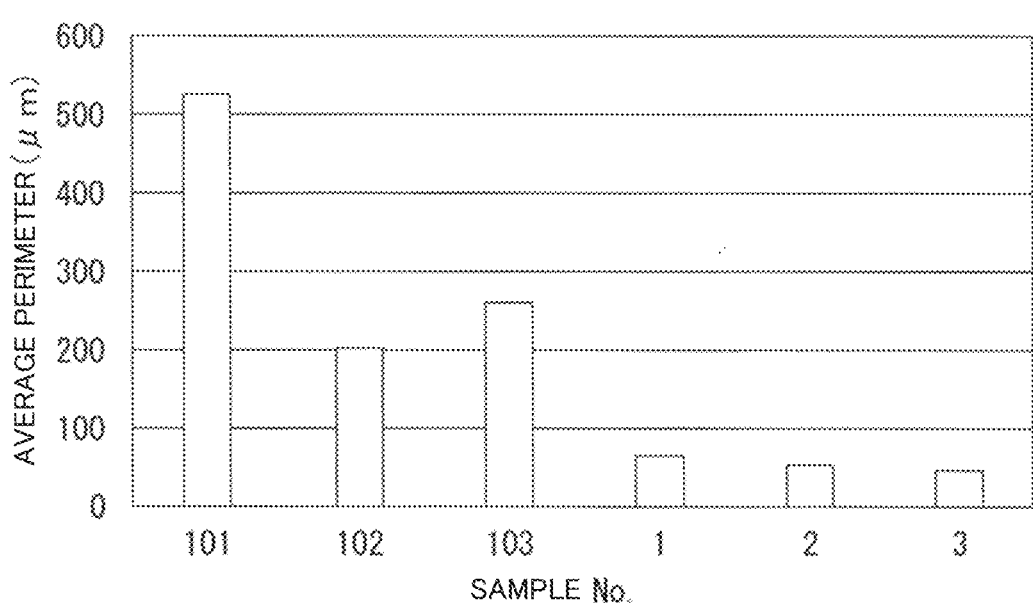
FIG. 4 is a graph showing an average perimeter of the pores in the sintered metal material of each sample produced in Test Example 1.

In addition, as shown in Table 1 and FIG. 4, it is found that, in the samples of high-density molding, the average perimeters of the pores are short compared with those in the samples of high-temperature sintering. Quantitatively, the average perimeters of the pores in the samples of high-density molding are 100 μm or less and, in the present example, particularly 70 μm or less. In the sintered metal materials for the samples No. 2 and No. 3, the average perimeters of the pores are 55 μm or less. In the sintered metal materials for the samples No. 2 and No. 3, the average perimeters of the pores are shorter.

In the samples of high-temperature sintering, the relative densities of the sintered metal materials are 93% or more, and each pore 11 has a large cross-sectional area and also a long perimeter, as shown in Table 1 and FIGS. 8A to 8C. One of the reasons therefor is considered as described below. The powder compacts used for the samples of high-temperature sintering have a small relative density and thus include a large number of pores compared with the powder compacts used for the samples of high-density molding. When a powder compact including a number of pores is sintered at a high temperature of the liquidus temperature, air bubbles are easily discharged to a certain extent, but a plurality of air bubbles bond to each other in the powder compact. Therefore, in the samples of high-temperature sintering, large pores are likely to remain, as shown in FIGS. 8A to 8C. That is, it is likely that pores having a large cross-sectional area and a long perimeter remain.

In contrast, in the samples of high-density molding, the numbers of pores 11 are somewhat large, but each pore 11 has a small cross-sectional area and also a short perimeter, as shown in Table 1 and FIGS. 2A to 2C. Among the sintered metal materials for the samples No. 1 to No. 3, the sample No 3 has the smallest number of pores 11, the smallest cross-sectional area of pore 11, and also the shortest perimeter. One of the reasons therefor is considered as described below. The powder compacts used for the samples of high-density molding have a large relative density and thus include a small number of pores. In addition, each pore is likely to be small due to compression. When such a powder compact is sintered at a relative low temperature, air bubbles are likely to be not discharged but remain, and each pore remains small. Therefore, in the samples of high-density molding, pores having a small cross-sectional area and a short perimeter are likely to remain, as shown in FIGS. 2A to 2C. In addition, as the number of pores in the powder compact decreases, the cross-sectional area of the pore in the sintered metal material is likely to be small, and the perimeter of the pore is likely to be short.

Additionally, the followings are found from this test.

Figure 5:
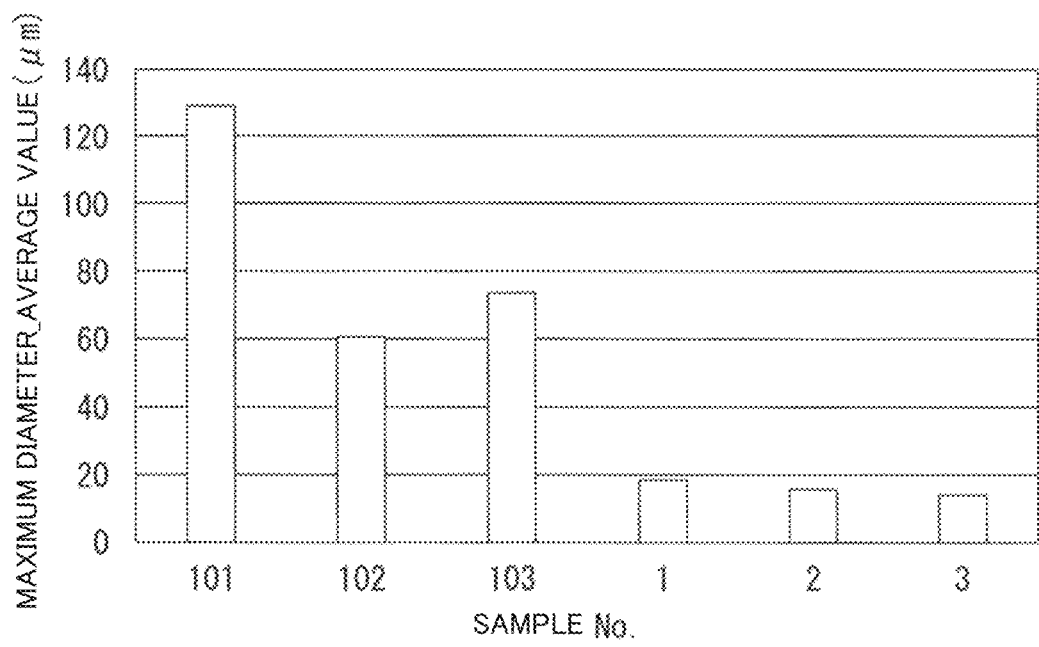
FIG. 5 is a graph showing an average value of maximum diameters of the pores in the sintered metal material of each sample produced in Test Example 1.

(1) As shown in Table 1 and FIG. 5, it is found that, in the samples of high-density molding, the average values of the maximum diameters of the pores are small compared with those in the samples of high-temperature sintering. Quantitatively, the average values of the maximum diameters in the samples of high-density molding are 30 μm or less and, in the present example, particularly 20 μm or less. In addition, the average values of the maximum diameters in the samples of high-density molding are 5 μm or more and, in the present example, particularly 10 μm or more. Such pores are small, but can be said to be not too small.

Figure 6:
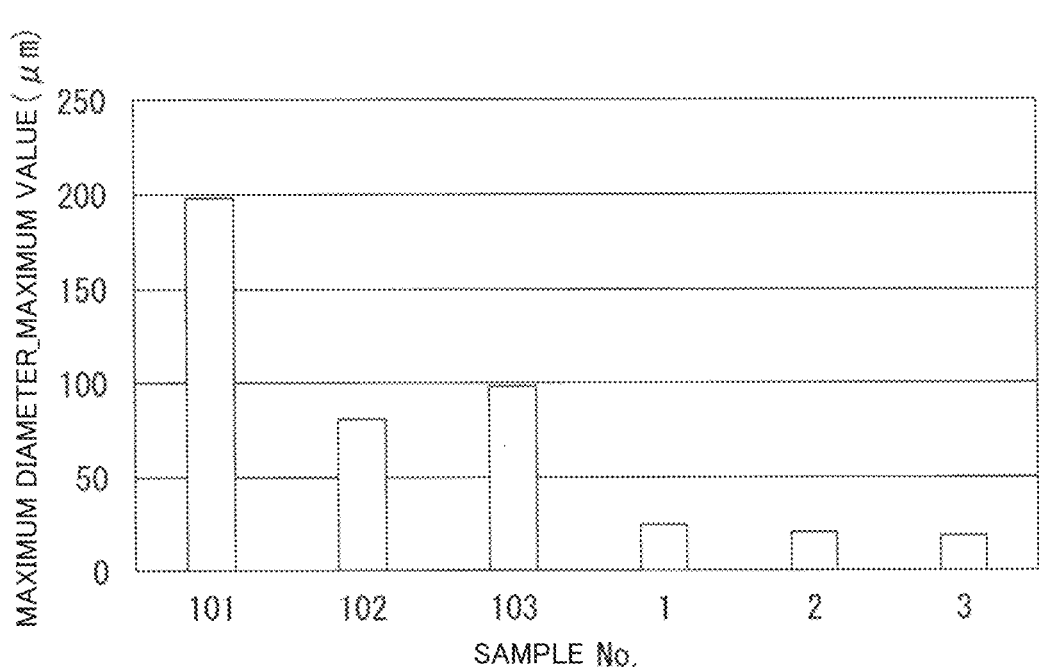
FIG. 6 is a graph showing a maximum value of the maximum diameters of the pores in the sintered metal material of each sample produced in Test Example 1.
Figure 7:
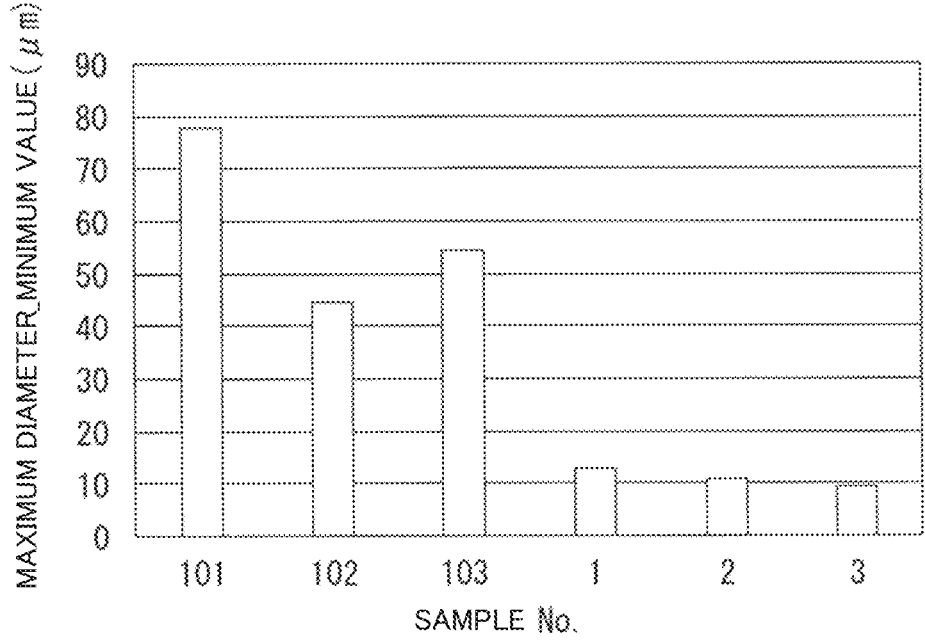
FIG. 7 is a graph showing a minimum value of the maximum diameters of the pores in the sintered metal material of each sample produced in Test Example 1.

(2) As shown in Table 1 and FIGS. 6 and 7, it is found that, in the samples of high-density molding, the maximum values and minimum values of the maximum diameters of the pores are small compared with those in the samples of high-temperature sintering. Quantitatively, the maximum values of the maximum diameters in the samples of high-density molding are 30 μm or less and, in the present example, particularly 25 μm or less. In addition, in the samples of high-density molding, differences between the average values and the maximum values in the maximum diameters are small compared with those in the samples of high-temperature sintering. Therefore, it can be said that the pores have uniform sizes in the samples of high-density molding. The minimum values of the maximum diameters in the samples of high-density molding are 20 μm or less and, in the present example, particularly 5 μm or more and 15 μm or less. From this fact, it can be said that the pores in the samples of high-density molding are small, but are not too small.

(3) As shown in Table 1, it is found that, in the samples of high-density molding, the roundness of the pore is small compared with that in the samples of high-temperature sintering. Quantitatively, the roundness of the pore in the samples of high-density molding is 3.4 or less and, here, furthermore, 3.3 or less.

In addition, this test indicated that sintered metal materials that has a relative density of 93% or more and 99.5% or less and includes small pores can be produced by sintering a powder compact that has a relative density of 93% or more and 99.5% or less at a relatively low temperature of lower than the liquidus temperature. In addition, it was indicated that the use of a powder made of an iron-based alloy having Vickers hardness Hv of 80 or more and 200 or less makes it possible to obtain a dense powder compact as described above.

In dense sintered metal materials that has a high relative density and includes small pores as described above, the pores are unlikely to serve as the origins of cracks, and the strength is excellent. Therefore, it is expected that the above-described sintered metal materials can be suitably used for a variety of components and the like for which a high strength is required. Specific examples of the components include the main bodies of cutting tools. In the above-described sintered metal materials, it is possible to effectively suppress vibrations or effectively release heat through the plurality of pores. Therefore, the sintered metal materials can be suitably used for the main bodies of cutting tools for which vibration damping or a heat dissipation property is desired.

Test Example 2

Tool main bodies made of sintered metal materials were produced and evaluated.

Tool main bodies were produced as described below.

A powder compact is molded by using a raw material powder.

The powder compact is processed into the shape of the tool main body.

The processed powder compact is sintered.

After the sintering, carburizing, quenching and tempering are sequentially performed.

The raw material powder is the same as that in Test Example 1. Specifically, the raw material powder is a powder mixture containing an alloy powder made of an iron-based alloy containing 2 mass % of Ni, 0.5 mass % of Mo and 0.2 mass % of Mn and a carbon powder. The content of the carbon powder is 0.3 mass % when the total mass of the powder mixture is regarded as 100 mass %.

The raw material powder was compressed to mold a columnar powder compact. The powder compact was molded by mold pressing. The molding pressure for the powder compact in each sample is the same as that for the sintered metal materials for the samples No. 1 to No. 3 in Test Example 1. The density (g/cm³) and relative density (%) of the powder compact for each sample are shown in Table 2. The density (g/cm³) and relative density (%) of the powder compact are obtained in the same manner as in Test Example 1.

The produced powder compact was cut and processed into the shape of the tool main body. In the present example, the powder compact was processed into the shape of the tool main body of a cutter shown in FIG. 1A. This cutter is a SEC-WAVEMILL WEX2000F manufactured by Sumitomo Electric Industries, Ltd, with a blade diameter of 40 mm.

After the processing, the powder compact was sintered. After the sintering, carburizing, quenching and tempering were performed, thereby obtaining the tool main body of each sample. The sintering temperature was set to 1130° C., which was the same as that for the samples No. 1 to No. 3. Each condition for the carburizing, the quenching and the tempering are the same as those for the samples No. 1 to No. 3.

For the sintered metal material configuring the tool main body of each sample obtained as described above, the composition of the parent phase was analyzed by ICP. As a result, the composition of the parent phase of the sintered metal material was an iron-based alloy containing 2 mass % of Ni, 0.5 mass % of Mo, 0.2 mass % of Mn and 0.3 mass % of C with Fe and an impurity as the remainder.

(Description of Samples)

The sintered metal materials forming the tool main bodies of samples No. 21 to No. 23 were obtained by sintering a powder compact having a relative density of 93% or more at a low temperature of 1130° C., which is lower than the liquidus temperature. For the tool main bodies of the samples No. 21 to No. 23, arbitrary cross sections were observed with a scanning electron microscope (SEM) in the same manner as for the samples No. 1 to No. 3.

(Density and Relative Density)

The density (g/cm³) and relative density (%) of the sintered metal material forming the tool main body of each sample were investigated. The density (g/cm³) and relative density (%) of the sintered metal material for each sample are shown in Table 2. The density (g/cm³) and relative density (%) of the sintered metal material are obtained in the same manner as in Test Example 1.

(Structural Observation)

For the sintered metal material forming the tool main body of each sample, an arbitrary cross section was taken, and pores were extracted by observing the cross section with SEM, thereby investigating the sizes of the pores. The sizes of the pores in the sintered metal material for each sample are measured in the same manner as those in the samples No. 1 to No. 3. The average cross-sectional area (μm²) of the pores, the average perimeter (μm) of the pores, the average value (μm) of the maximum diameters of the pores, the maximum value (μm) of the maximum diameters of the pores and the minimum value (μm) of the maximum diameters of the pores in the sintered metal material for each sample are shown in Table 2.

TABLE 2

| | Sample NO. | 21 | 22 | 23 |
|---|---|---|---|---|
| Powder compact | Density (g/cm³) | 7.33 | 7.56 | 7.70 |
| | Relative density (%) | 94.0 | 96.9 | 98.7 |
| | Sintering temperature (° C.) | 1130 | 1130 | 1130 |

TABLE 2-continued

| Sample NO. | | 21 | 22 | 23 |
|---|---|---|---|---|
| Sintered metal material | Density (g/cm³) | 7.35 | 7.57 | 7.71 |
| | Relative density (%) | 94.2 | 97.1 | 98.8 |
| | Average cross-sectional area (μm²) | 424 | 298 | 259 |
| | Average perimeter (μm) | 64 | 53 | 45 |
| | Maximum diameter (average value) (μm) | 18 | 15 | 14 |
| | Maximum diameter (maximum value) (μm) | 24 | 20 | 18 |
| | Maximum diameter (minimum value) (μm) | 13 | 11 | 9 |
| | N number (pores) | 169 | 212 | 162 |

Inserts were attached to the tool main bodies of the samples No. 21 to No. 23 to assemble cutters. In addition, the tool main body of each sample was used as a cutter to perform cutting. As the insert, AXMT123504PEER-G manufactured by Sumitomo Electric Industries, Ltd. was used. The kind of material of the insert is cemented carbide. As the cutting, an end surface of a column, which was a work material, was cut using the above-described cutter. The substance of the work material is SCM440. The diameter of the column is 75 mm. The length of the column is 30 mm. Cutting conditions are shown below.

(Cutting Conditions)

Cutting speed: 100 m/min

Feed amount: 0.4 mm/t

Cutting depth: 3 mm

Cutting environment: Dry

The feed amount is a feed amount per blade.

As a comparison, a tool main body made of a cast material was provided. The tool main body provided is a holder for milling and produced by shaving a cast material of SKD61. The shape of this tool main body is the same shape as those of the tool main bodies of the samples No. 21 to No. 23. The tool main body made of a cast material is used as a sample No. 200.

For the tool main body of the sample No. 200, an arbitrary cross section was observed with SEM. As a result, pores were substantially not present in the cast material forming the tool main body of the sample No. 200. That is, the cast material forming the tool main body of the sample No. 200 has a relative density of substantially 100%.

An insert was attached to the tool main body of the sample No. 200, and cutting was performed under the same conditions for the samples No. 21 to No. 23.

(Evaluation of Processing Accuracy)

Processing accuracy in the case of using the tool main bodies of the samples No. 21 to No. 23 and the tool main body of the sample No. 200 was evaluated. The processing accuracy was evaluated in terms of the surface roughness on the end surface of the processed work material. It can be said that as the surface roughness of the processed surface is smaller, the processing accuracy is higher. In the present example, the surface roughness in the radial direction on the end surface of the work material was measured. The surface roughness measured is arithmetic average roughness Ra. The surface roughness was measured according to JIS B0601-2001, the reference length was set to 0.1 mm, and the evaluation length was set to 2.0 mm. As a result, in all cases of using the cutters for which the tool main bodies of the samples No. 21 to No. 23 were used, the arithmetic average roughness Ra in the radial direction on the end surface of the work material was 1 μm or less. In contrast, in the case of using the cutter for which the tool main body of the sample No. 200 was used, the arithmetic average roughness Ra in the radial direction on the end surface of the work material was 3 μm.

As described above, in the case of using the tool main bodies of the samples No. 21 to No. 23, the surface roughness on the end surface of the work material is small compared with the case of using the tool main body of the sample No. 200. This fact shows that, in the case of using the tool main bodies of the samples No. 21 to No. 23, the processing accuracy is excellent. The reason therefor is considered as described below. Since the tool main bodies of the samples No. 21 to No. 23 are made of the sintered metal materials, it is possible to effectively suppress vibrations through the plurality of pores in the sintered metal materials. That is, the tool main bodies of the samples No. 21 to No. 23 are excellent in terms of vibration damping. Therefore, it is considered that, in a case where the tool main bodies of the samples No. 21 to No. 23 are used, chatter or the like that is generated during processing is suppressed, whereby the processing accuracy improves.

Using the cutters for which the tool main bodies of the samples No. 21 to No. 23 were used, respectively, the above-described cutting was performed repeatedly 1000 times, and then whether or not a crack or a chip was generated in the tool main body was investigated. As a result, in all of the tool main bodies, any damage such as a crack was not found. From this fact, it is found that the tool main bodies of the samples No. 21 to No. 23 have a sufficiently high strength.

REFERENCE SIGNS LIST

1 Sintered metal material

10 Parent phase

11 Pore

100, 200 Tool

101, 201 Insert

102, 202 Cutting blade

103, 203 Through hole

110, 210 Tool main body

111, 211 Attaching seat

The invention claimed is:

1. A tool main body to which an insert is attachable, wherein the tool main body is made of a sintered metal material, wherein the sintered metal material includes:

a parent phase made of a metal and a plurality of pores present in the parent phase, wherein the sintered metal material has a relative density of 93% or more and 99.5% or less, wherein, on an arbitrary cross section of the sintered metal material, an average perimeter of the pores is 100 μm or less, an average cross sectional area of the pores is 200 μm² or more and 500 μm² or less, and an average value of maximum diameters of the pores is 5 μm or more and 30 μm or less.

2. The tool main body according to claim 1, wherein the plurality of pores is dispersed in the parent phase in an isotropic manner.

3. The tool main body according to claim 1, wherein the metal is an iron-based alloy, and the iron-based alloy contains one or more elements selected from the group consisting of C, Ni, Mo and B.

4. A method for producing the tool main body according to claim 1, the method comprising:

molding a powder compact by compressing a raw material powder containing a metal powder;

mechanically processing the powder compact into a shape of the tool main body; and sintering the powder compact processed into the shape of the tool main body, wherein, in producing the powder compact, the powder compact has a relative density of 93% or more and 99.5% or less, and wherein, in sintering the powder compact, a sintering temperature is lower than the liquidus temperature.

5. The method according to claim 4, wherein, in sintering the powder compact, the sintering temperature is 1000° C. or more and lower than 1200° C.

6. The method according to claim 4, wherein the metal powder contains a powder made of an iron-based material having Vickers hardness Hv of 80 or more and 200 or less.

7. The method according to claim 6, wherein the powder made of the iron-based material contains a powder made of an iron-based alloy, and the iron-based alloy contains at least one element of Mo in an amount 0.1 mass % or more and 2.0 mass % or less and Ni in an amount of 0.5 mass % or more and 5.0 mass % or less.

8. The method according to claim 5, wherein the metal powder contains a powder made of an iron-based material having Vickers hardness Hv of 80 or more and 200 or less.

9. The method according to claim 8, wherein the powder made of the iron-based material contains a powder made of an iron-based alloy, and the iron-based alloy contains at least one element of Mo in an amount 0.1 mass % or more and 2.0 mass % or less and Ni in an amount of 0.5 mass % or more and 5.0 mass % or less.

10. The tool main body according to claim 1, wherein a maximum value of the maximum diameters of the pores is 30 μm or less.

11. The tool main body according to claim 1, wherein a minimum value of the maximum diameters of the pores is 3 μm or more and 20 μm or less.

12. The tool main body according to claim 1, wherein the average perimeter of the pores is 10 μm or more.

13. The tool main body according to claim 1, wherein a roundness of the pore on the cross section is 3.4 or less.

14. The tool main body according to claim 1, wherein the average perimeter of the pores is 50 μm or more and 100 μm or less.

15. The tool main body according to claim 1, wherein the average cross sectional area of the pores is 259 $\mu m^2$ or more and 500 $\mu m^2$ or less.

16. The tool main body according to claim 1, wherein the average perimeter of the pores is 53 μm or more and 100 μm or less.

\* \* \* \* \*